United States Patent
Takano et al.

(10) Patent No.: US 7,525,478 B2
(45) Date of Patent: Apr. 28, 2009

(54) RADAR SIGNAL PROCESSOR

(75) Inventors: Gaku Takano, Tokyo (JP); Chiharu Yamano, Tokyo (JP); Kazuma Natsume, Aichi-ken (JP); Yasuyuki Miyake, Aichi-ken (JP); Yasushi Sakuma, Aichi-ken (JP)

(73) Assignees: Denso IT Laboratory, Inc., Tokyo (JP); Denso Corporation, Aichi-Ken (JP)

( * ) Notice: Subject to any disclaimer, the term of this patent is extended or adjusted under 35 U.S.C. 154(b) by 293 days.

(21) Appl. No.: 11/376,625

(22) Filed: Mar. 15, 2006

(65) Prior Publication Data

US 2007/0024492 A1   Feb. 1, 2007

(30) Foreign Application Priority Data

Mar. 31, 2005   (JP)   ............... 2005-100324

(51) Int. Cl.
G01S 13/56   (2006.01)
G01S 13/93   (2006.01)

(52) U.S. Cl. ............... 342/145; 342/70; 342/189

(58) Field of Classification Search ............... 342/145
See application file for complete search history.

(56) References Cited

FOREIGN PATENT DOCUMENTS

| | | | |
|---|---|---|---|
| JP | 2003-037539 A | 2/2003 | |
| JP | 2003-218759 A | 7/2003 | |
| JP | 2003-218826 A | 7/2003 | |
| JP | 2003-318792 A | 11/2003 | |

OTHER PUBLICATIONS

"Adaptive Antenna Technique," p. 107-167, by Nobuo Kikuma, published Oct. 10, 2003 by Ohmsha.
"Radar Signal Processing Technique," p. 280-301, by Matsuo Sekine, The Institute of Electronics, Information and Communication Engineers, published Sep. 20, 2001.
"Optimum Array Processing," p. 1154-1195, by Harry L. Van Trees, published 2002.
Abstract, "Discrimination of radar clutter by texture analysis," by Ogata, M; Sekine, M.; Musha, T., published Jun. 1986.

*Primary Examiner*—Thomas H Tarcza
*Assistant Examiner*—Matthew M Barker
(74) *Attorney, Agent, or Firm*—Duane Morris LLP

(57) ABSTRACT

A radar signal processor is disclosed having an observation mechanism for receiving a reflected wave from a target and for outputting a predetermined observation signal. The processor extracts a distance component corresponding to a distance from each observation signal. The processor further collects the respective distance components and computes an estimated value of a corresponding correlation matrix with a forgetting factor as a parameter using a method for estimating correlation matrix with exponential smoothing. The processor further estimates the presence or movement state of the target on the basis of the respective estimated values of the correlation matrices and outputs the computed values.

5 Claims, 26 Drawing Sheets

FIG. 12
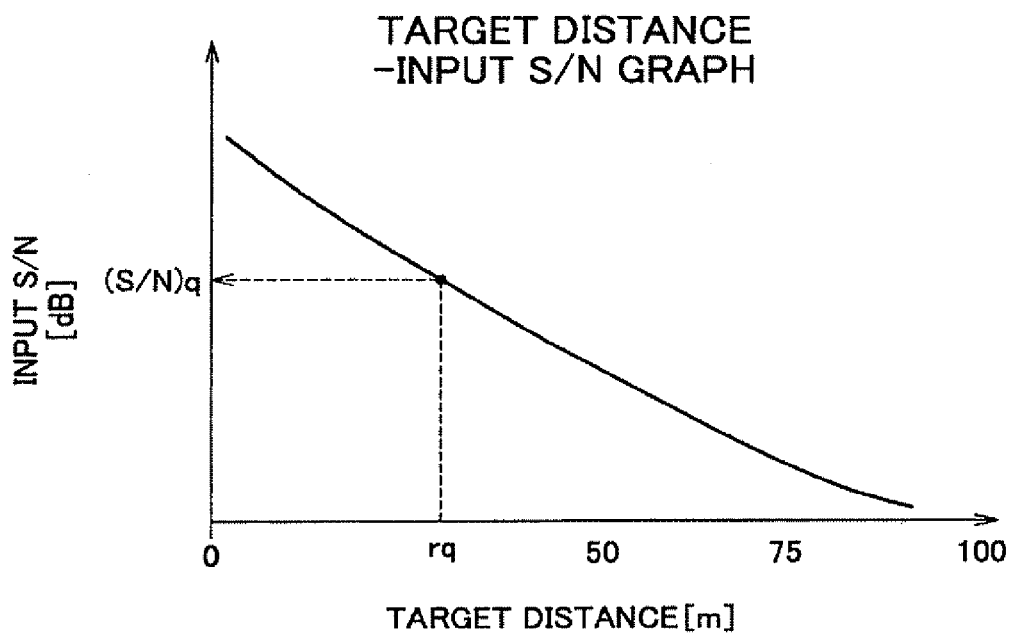
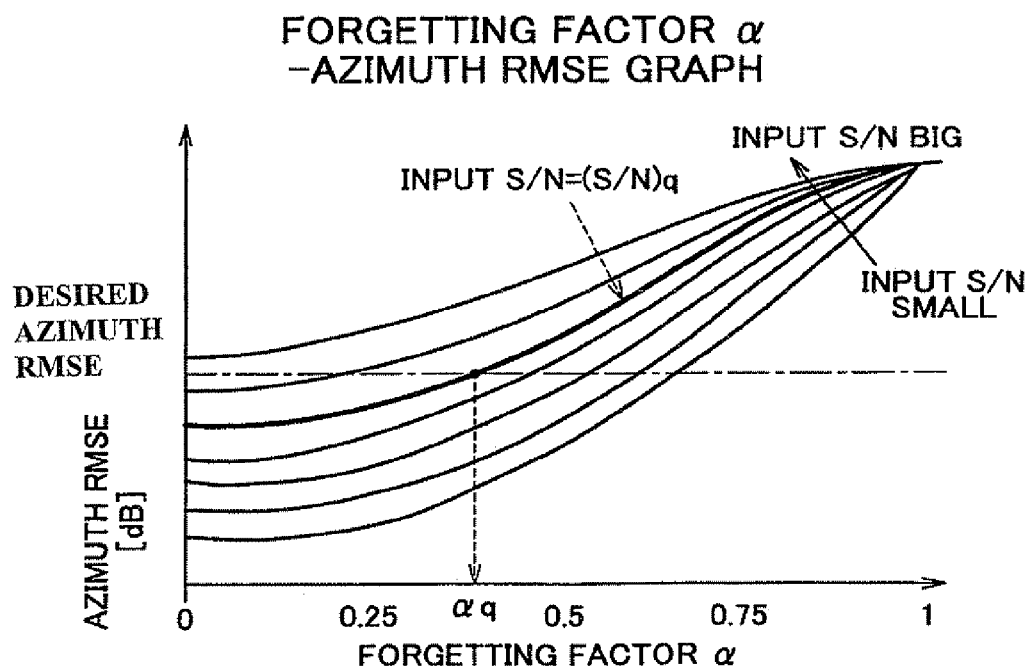

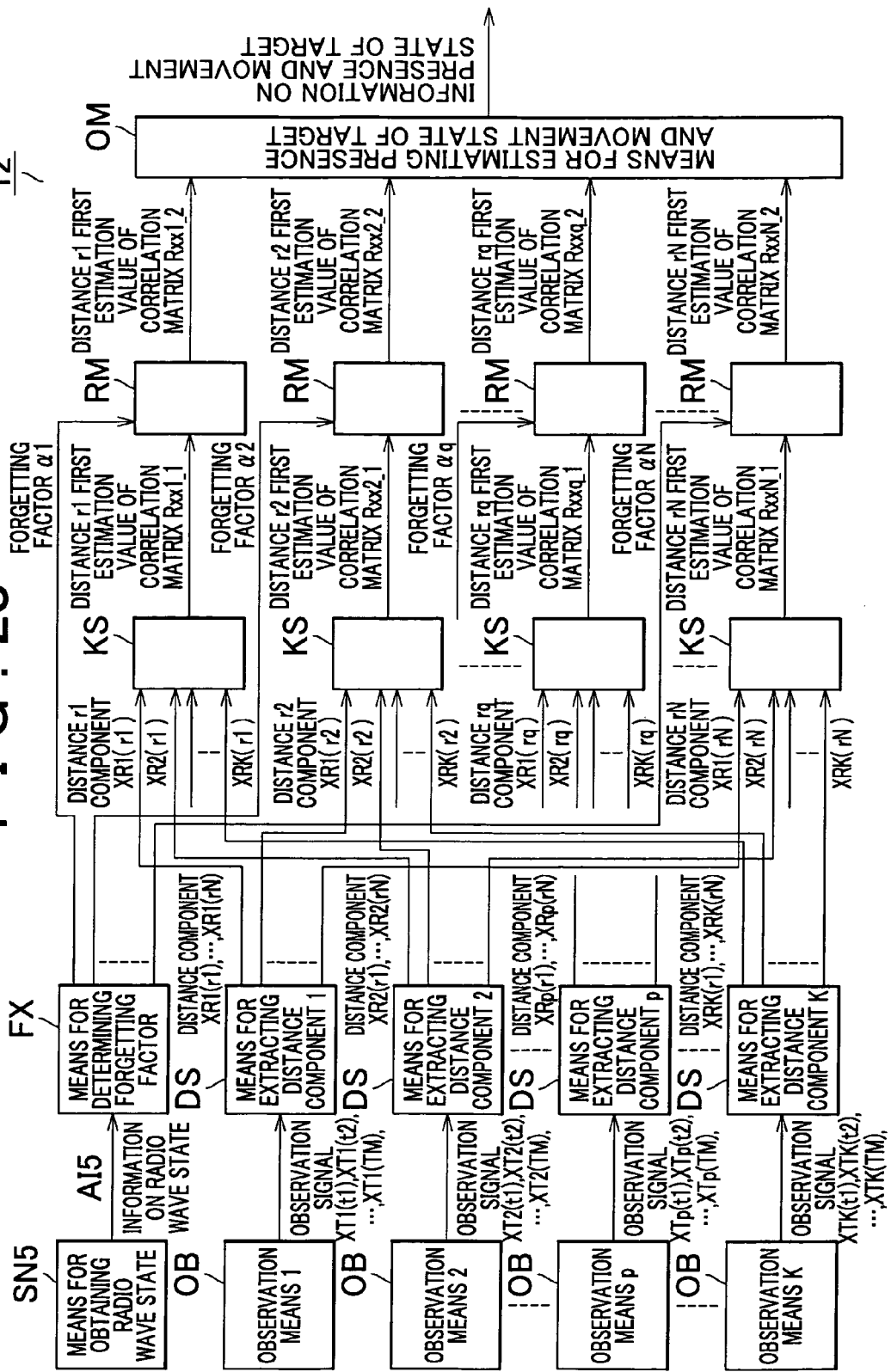

RADAR SIGNAL PROCESSOR

BACKGROUND OF THE INVENTION

This invention relates to a signal processor of a vehicle-mounted array radar apparatus having a plurality of antenna components.

Vehicle-mounted radar apparatus are known for predicting the presence or a movement state of a preceding target, such as a preceding vehicle in order to prevent collisions and to maintain an inter-vehicle distance with respect thereto.

Some vehicle-mounted array radar apparatus may have a plurality of observation means, a plurality of means for respectively extracting distance components, a plurality of means for respectively estimating correlation matrices with exponential smoothing, and means for estimating presence and movement state of a target.

FIG. 2 is a block diagram showing a schematic structure of a conventional vehicle-mounted array radar apparatus. FIG. 3 is a view showing a structure of a FM-CW radar which is an instance of the observation means. FIG. 4 is a view showing a structure of a pulse radar which is an instance of the observation means.

A conventional vehicle-mounted array radar apparatus as shown in FIG. 2. Such a radar apparatus has observation means 1 through K denoted with reference numerals OB, means for respectively extracting distance components 1 through K denoted with reference numerals DS, means for respectively estimating correlation matrices with exponential smoothing 1 through N denoted with reference numerals RM, and means for estimating presence and movement state of target denoted with a reference numeral OM.

In operation, the observation means p (array component p=1, 2, ... K) acquires an observation signal which includes information regarding the presence and movement state of a target obtained from a transmitted signal which is a radar wave and a received signal received by an antenna. The movement states of a target include positions (distance and azimuth), velocities, accelerations and the like. As shown in FIG. 2, the observation means p (array component p=1, 2, ... K) outputs observation signals $XTp(t1)$, $XTp(t2)$, $XTp(t3)$, ... $XTp(tM)$ which are sampled at times t1, t2, ... tM. M numbers of the observation signals which are sampled at times t1, t2, ... tM is referred to as one snapshot. The observation means 1 through K correspond to array components 1 through K. A linear array is known as a physical arrangement of the array components.

An example of a FM-CW radar will now be described. A FM-CW radar, which is the observation means OB, has an oscillator 1, a transmitting amplifier 2, a transmitting antenna 3, a receiving antenna 5, a receiving amplifier 6, a distributor 7, a mixer 9, a filter 10, and an A/D converter 11, as shown in FIG. 3. The oscillator 1 oscillates millimetric-wave signals which are modulated such that the frequency increases and decreases linearly with passage of time to form a triangular wave form, and the millimetric-wave signal is emitted as a transmitted signal S1 via the transmitting amplifier 2 and the transmitting antenna 3. At the same time, the reflected wave of the transmitted signal is received as a received signal S2 through the receiving antenna 5. After amplifying the signal S2 by the receiving amplifier 6, it is mixed with the transmitted signal S1 by the distributor 7 and the mixer 9. The mixed signal S3 is filtered, and converted into a digital signal by the A/D converter 11 so as to be sampled. This sampled signal S3 is the observation signal outputted by the observation means OB. Although the array radar has a plurality of observation means OB as shown in FIG. 2, the transmitted signals S1 in the respective observation means OB are common.

Next, an example of a pulse radar, which is another instance of observation means OB, will be described. The observation means OB in the pulse radar example is comprised of an oscillator 1, a transmitting amplifier 2, a transmitting antenna 3, a receiving antenna 5, a receiving amplifier 6, a filter 10 and an A/D converter 11, as shown in FIG. 4. The oscillator 1 oscillates pulses which are obtained by dividing a signal having high frequency f0 every equal interval at a cycle of fr[Hz], and the transmitted signal S1 is emitted through the transmitting amplifier 2 and the transmitting antenna 3 (pulse transmission). At the same time, the reflected wave of the transmitted signal S1 is received as a received signal S2 through the receiving antenna 5. After the signal S2 is amplified using the receiving amplifier 6, it is filtered, and is output to the A/D converter 11 through a phase detector (not shown). The signal is converted into digital signal S3 by the A/D converter 11 which is triggered by pulse transmission, and the digital signal S3 is sampled. This sampling signal S3 is the observation signal S3 which the observation means OB outputs. Similar to the FM-CW radar, the transmitted signals S1 used in the respective observation means OB are common.

The means for extracting distance component p (array component p=1, 2, ... K) as shown in FIG. 2 extracts distance components $XRp(r1)$, ... $XRp(rN)$ corresponding to distances r1, ... rN from the observation signals $XTp(t1)$, $XTp(t2)$, $XTp(t3)$, ... $XTp(tM)$ of one snapshot which are output from the observation means p.

An example of a FM-CW radar will now be described. When a target having velocity V exists at a position of distance r from the receiving antenna 5 ("distance r" being a half of a distance from the transmitting antenna to the receiving antenna via a target. The distance r from the receiving antenna 5 is adopted as "distance r", provided that the transmitting antenna and the receiving antenna are positioned at the same position. This explanation is applied to all descriptions in the present specification when referring to the distance up to a target r), the observation signals $XTp(t1)$, $XTp(t2)$, $XTp(t3)$, ... $XTp(tM)$ of the FM-CW radar include a frequency component of fB[Hz] as shown in expression (1).

[Expression 1]

$$f_B = \frac{4 \cdot \Delta F}{V_C \cdot T_m} \cdot r \pm \frac{2 \cdot F_0}{V_C} \cdot V [\text{Hz}] \qquad (1)$$

(+: at the time of modulation by increasing frequency,
−: at the time of modulation by decreasing frequency)

where r denotes distance to a target, V denotes relative velocity of a target, Vc is light speed, ΔF is frequency deviation width of frequency modulation, Tm denotes cycle period of frequency modulation, and Fo denotes central transmitting frequency. If relative velocity is neglected, the following relation which is shown by expression (2) is given between distance r and frequency fB.

[Expression 2]

$$f_B = \frac{4 \cdot \Delta F}{V_C \cdot T_m} \cdot r [\text{Hz}] \quad (2)$$

If respective frequency components fb corresponding to distances r1 through rN are obtained from the observation signals XTp(t1), XTpft2), XTp(t3), . . . XTp(tM) which are time signal series, the components thus obtained are distance components XRp(r1), . . . XRp(rN). If an absolute value of the distance component XRp(rq) is big, it is understood that a target exists at the distance rq. On the contrary, if an absolute value of the distance component XRp(rq) is small, it is understood that a target does not exist at the distance rq. Fourier transformation or filtering with a band-pass filter is used as a method for extracting frequency components.

Besides, a case of a pulse radar is mentioned as another instance. If a target exists at the distance r, an echo from the target is observed in the observation signal at a time

[Expression 3]

$$t_e = \frac{2}{V_C} \cdot r \quad (3)$$

from a time when emitting a pulse where r denotes distance to the target, and Vc denotes light speed. If the observation signals XTp(t1) XTp(t2), XTp(t3), . . . XTp(tM) are sampled at echo starting times te respectively corresponding to distances r1 through rN, the sampled components are distance components XRp(r1), . . . XRp(rN). Such sampling may be conducted after simple sampling or average filtering.

The means for estimating correlation matrix with exponential smoothing q (distance rq:q=1, 2, . . . N) estimates a correlation matrix Rxxq which represents a correlation characteristics between array components (coherence) from output signals XR1(rq), XR2(rq), . . . XRK(rq) of the means for extracting distance component 1 through K, the output signals being signals relating to the distance rq which is obtained by each array component. The correlation matrix Rxxq is given by Expression (4). In this example, the correlation matrix Rxxq is a complex matrix with K rows and K columns, and a component with i-th row and j-th column is represented by rxxqij.

[Expression 4]

$$R_{xxq} = \begin{bmatrix} r_{xxq11} & \cdots & r_{xxq1j} & \cdots & r_{xxq1K} \\ \vdots & & \vdots & & \vdots \\ r_{xxqi1} & \cdots & r_{xxqij} & \cdots & r_{xxqiK} \\ \vdots & & \vdots & & \vdots \\ r_{xxqK1} & \cdots & r_{xxqKj} & \cdots & r_{xxqKK} \end{bmatrix} \quad (4)$$

$$\triangleq \begin{bmatrix} E[XR1(rq)XR1(rq)^*] & \cdots & E[XR1(rq)XRj(rq)^*] & \cdots & E[XR1(rq)XRK(rq)^*] \\ \vdots & & \vdots & & \vdots \\ E[XRi(rq)XR1(rq)^*] & \cdots & E[XRi(rq)XRj(rq)^*] & \cdots & E[XRi(rq)XRK(rq)^*] \\ \vdots & & \vdots & & \vdots \\ E[XRK(rq)XR1(rq)^*] & \cdots & E[XRK(rq)XRj(rq)^*] & \cdots & E[XRK(rq)XRK(rq)^*] \end{bmatrix}$$

*represents a complex conjugate. E[] represents an operation for obtaining an expected value, and is actually estimated by time average in the unit of one snapshot.

Since the correlation matrix is estimated in snapshots, an estimated value of the correlation matrix after a first snapshot is represented by Rxxq(1), an estimated value after a second snapshot is represented by Rxxq(2), and an estimated value after a m-th snapshot is represented by Rxxq(m). When referring to the distance component in a specific snapshot, the distance rq component of the observation means p in the m-th snapshot is represented by XRp (rq, m), and similar expression is used for the observation signal, also.

With such kind of expression method, a correlation matrix observation value in the m-th snapshot Rtmp_xxq(m) is calculated by an expression (5).

[Expression 5]

$$R_{tmp\_xxq}(m) = \begin{bmatrix} r_{tmp\_xxq11}(m) & \cdots & r_{tmp\_xxq1j}(m) & \cdots & r_{tmp\_xxq1K}(m) \\ \vdots & & \vdots & & \vdots \\ r_{tmp\_xxqi1}(m) & \cdots & r_{tmp\_xxqij}(m) & \cdots & r_{tmp\_xxqiK}(m) \\ \vdots & & \vdots & & \vdots \\ r_{tmp\_xxqK1}(m) & \cdots & r_{tmp\_xxqKj}(m) & \cdots & r_{tmp\_xxqKK} \end{bmatrix} \quad (5)$$

$$\triangleq \begin{bmatrix} XR1(rq,m)XR1(rq,m)^* & \cdots & XR1(rq,m)XRj(rq,m)^* & \cdots & XR1(rq,m)XRK(rq,m)^* \\ \vdots & & \vdots & & \vdots \\ XRi(rq,m)XR1(rq,m)^* & \cdots & XRi(rq,m)XRj(rq,m)^* & \cdots & XRi(rq,m)XRK(rq,m)^* \\ \vdots & & \vdots & & \vdots \\ XRK(rq,m)XR1(rq,m)^* & \cdots & XRK(rq,m)XRj(rq,m)^* & \cdots & XRK(rq,m)XRK(rq,m)^* \end{bmatrix}$$

As a method of estimating a correlation matrix, a section average type and an exponential smoothing type are well-known.

In the method of estimating correlation matrix with section average, an average value between correlation matrix observation values of snapshots which continues predetermined SSN [times] is used as an estimated value of the correlation matrix. A number of sampling SSN [times] for equalization relates to S/N improvement. If SSN becomes bigger, the influence of noise in an observation signal is removed, so that S/N improves. One of the methods of calculating the estimated value is shown in an expression (6)

[Expression 6]

$$R_{xxq}(m) = \frac{1}{SSN} \sum_{j=0}^{SSN-1} R_{tmp\_xxq}(m-j) \quad (6)$$

Although this refers to a case where the estimated value of the correlation matrix is renewed, synchronizing with the snapshot, the renewal cycle of the estimated value of the correlation matrix may be once SSN snapshot times. In such a case, the estimated value of the correlation matrix is renewed as shown by an expression (7)

[Expression 7]

$$R_{xxq}(m') = \frac{1}{SSN} \sum_{j=1}^{SSN} R_{imp\_xxq}(SSN \cdot (m'-1) + j) \quad (7)$$

where Rxxq(m') means the estimated value of the correlation matrix which is renewed in the m'-th snapshot.

The method of estimating correlation matrix with exponential smoothing is one of obtaining the estimated value of the correlation matrix by respectively weighting the estimated value of the correlation matrix of the last snapshot and the observation value of the correlation matrix which is obtained in the present snapshot and adding them together. A weight of the estimated value of the correlation matrix of the last snapshot is referred to as a forgetting factor, and is represented by α. At this time, a weight of the observation value of the correlation matrix which is obtained in the present snapshot is 1-α. A method of calculating the estimated value in the method of estimating correlation matrix with exponential smoothing is shown in expression (8).

[Expression 8]

$$R_{xxq}(m) = \alpha \cdot R_{xxq}(m-1) + (1-\alpha) \cdot R_{tmp\_xxq}(m) \quad (8)$$

The number of sampling SSN [times] for equalization in the section average method which has been mentioned before and the forgetting factor α have the following relation as shown by expression (9) in view of dispersion of the estimated value.

[Expression 9]

$$\alpha = \frac{SSN - 1}{SSN + 1} \quad (9)$$

Expression (9) is introduced by such a condition where dispersion of the estimated value is equal in the section average method and the exponential smoothing method if each element of the observation value of the correlation matrix conforms to a chi-square distribution of degree of freedom 2, but this will not be described in detail. Then, SSN is made bigger as a approximates 1, so that the effect of the S/N improvement is made bigger. Therefore, the forgetting factor α is a parameter for adjusting the S/N improvement.

If expression (8) is accepted as an IIR filter, a transient response performance on a change of the observation value of the correlation matrix is improved when a approximates zero (0), so that the forgetting factor α is a parameter for adjusting the transient response performance.

In the array radar apparatus as shown in FIG. 2, the means for estimating correlation matrix with exponential smoothing q (distance component rq: q=1, 2, ... N) executes the estimating method of expression (8), and the correlation matrix estimated value Rxxq corresponding to each distance component rq is output to the means for estimating presence and movement state of target OM.

The means for estimating presence and movement state of target OM estimates the presence of a target and a movement state of the target from the correlation matrix estimated values Rxx1 through RxxN corresponding to the distances r1 through rN. FIG. 5 shows an example of its schematic structure.

The means for estimating presence and movement state of a target OM of FIG. 5 is comprised of means for computing angular spectrum corresponding to the distances r1 through rN, which are denoted with reference numerals AS, and data association means which is denoted with a reference numeral DA.

The means for computing angular spectrum q (distance rq:q=1, 2, ... N) computes an angular spectrum Pq(θ) from the estimated value of the correlation matrix. The angular spectrum represents a power angular distribution, and Pq(θ1) represents a power which arrives from the azimuth θ1. Known computing method include a beamformer method, a Capon's method, a Linear Prediction method, MUSIC, ESPRIT and the like (see non-patent-related document 1). In the MUSIC or ESPRIT methods, power can not be directly obtained, so it may be referred to as a pseudo spectrum. All angular spectra including pseudo spectra are referred to as only angular spectra in the present embodiment. An intense reflected wave is considered to arrive from an angle where the spectral intensity is intense in the angular spectra, so that a target is predicted to be in this azimuth. In the case of the angular spectrum Pq(θ) as shown in FIG. 6, for instance, a target is predicted to be at θ1, θ2 and θ3 [°], which spectrum intensities are intense.

The data association means DA estimates the presence and a movement state of a target by inputting the angular spectra P1(θ) through PN(θ) corresponding to the distances r1 through rN. If the angular spectrum of FIG. 6 is inputted as one of the distance rq, for instance, the data association means DA estimates the presence of three targets (distance, azimuth)=(rq, θ1), (distance, azimuth)=(rq, θ2) and (distance, azimuth)=(rq, θ3). If the angular spectrum of FIG. 7 is inputted as one of the distance rq, for instance, the data association means DA estimates no presence of target at the distance rq. The above-mentioned example is a very simplified estimation example. The positioning estimation accuracy may be increased by estimation with a combination of the angular spectra P1(θ) through PN(θ) in a plurality of snapshots. In addition, the movement state, such as the velocity or the acceleration of the target, may be estimated in such a manner that a tracking process in an axial direction of the snapshot is applied to positioning information which is obtained from the angular spectrum.

In case of the FM-CW radar, the velocity of the target may be detected by Doppler effect by comparing two kinds of the angular spectra 1 through N, the snapshot at the time of modulation by increasing frequency, and the snapshot at the time of modulation by decreasing frequency.

Further, the movement state of the target may be known in such a way that the angular spectra 1 through N are overlapped with each other so as to prepare a two-dimensional distance-angular spectrum, and the prepared spectrum is treated as an image and is recognized by patterns (see non-patent-related document 2).

[Non-patent-related document 1] "Adaptive antenna technique" has been published on Oct. 10, 2003 by Ohmsha written by Nobuo KIKUMA

[Non-patent-related document 2] "Radar signal processing technique" has been published on Sep. 20, 1991 by "The institute of Electronics, Information and Communication Engineers" written by Matsuo SEKINE, the chapter 10 "Pattern recognition in radar signal processing".

The above-mentioned examples describe the structure of the array radar signal processor for estimating the presence and the movement state of the target. In order to accurately estimate the presence and the movement state of the target, it is necessary to properly estimate the correlation matrix which is the intermediate data.

It is difficult to properly estimate the correlation matrix in the vehicle-mounted radar due a number of factors, including: distance attenuation of the reflected wave from the target, a change of a reflected wave from a target which arises from a change of the movement state of ones own vehicle, such as the change in turning and the change of speed, a change of a reflected wave from a target which arises from a change of the surroundings of ones own vehicle, such as the change in the speed of the peripheral vehicle, and a change of a radio wave state, such as an influence of an interfering wave.

The object of the invention is to provide a radar signal processor for properly estimating the correlation matrix according to the distance attenuation of the reflected wave from the target, the change of the reflected wave due to the changes of the movement state and surroundings of ones own vehicle, and the radio wave state.

BRIEF DESCRIPTION OF THE DRAWINGS

FIG. 12 is a graphical representation for describing a method of determining the forgetting factor α according to distance attenuation;

FIG. 28 is a block diagram showing a schematic structure of the vehicle-mounted array radar apparatus of a twenty-second embodiment of the invention.

SUMMARY OF THE INVENTION

Figure 1:
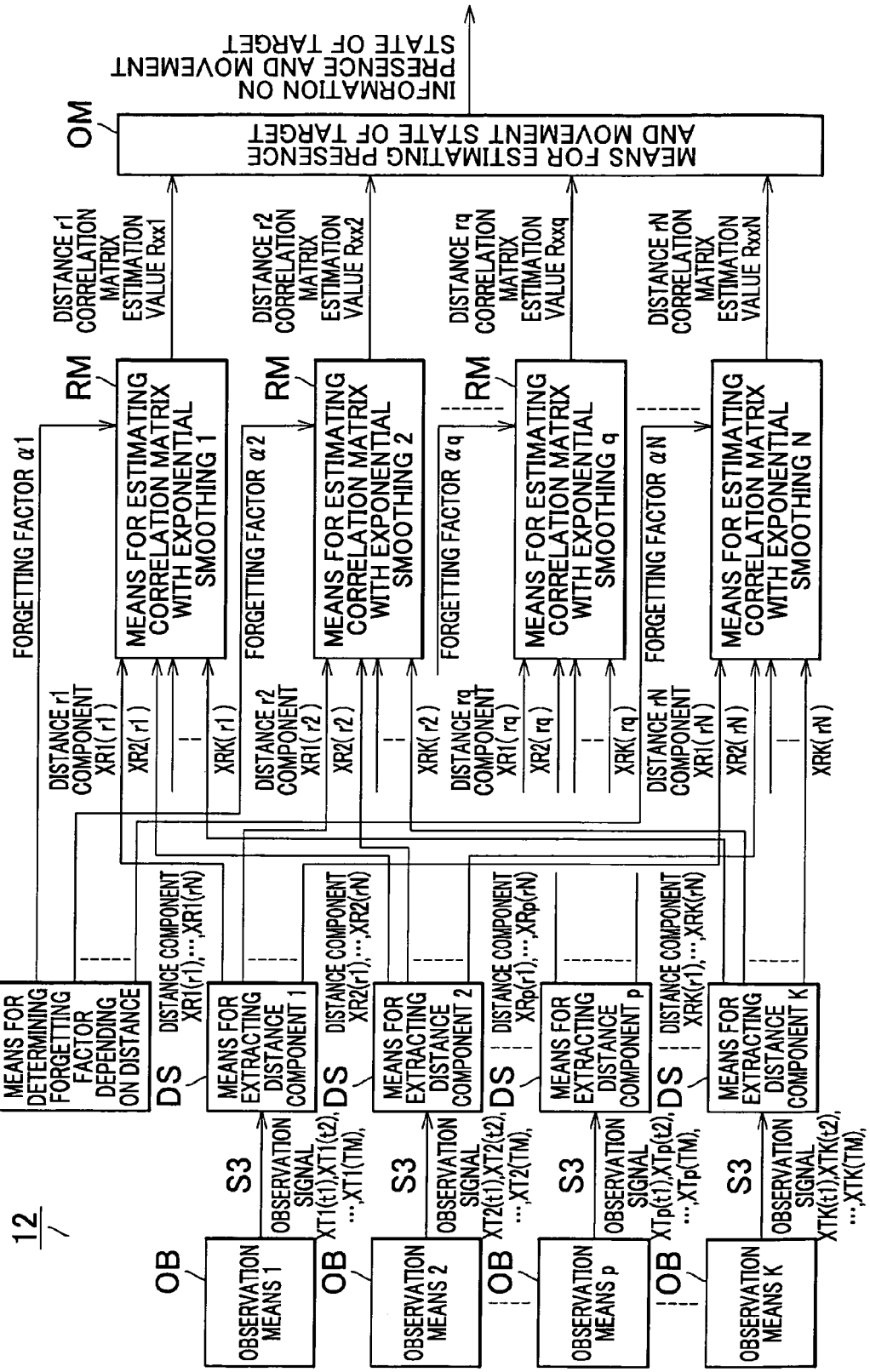
FIG. 1 is a block diagram showing a schematic structure of a vehicle-mounted array radar apparatus of a first embodiment of the invention.

One aspect of the invention is a radar signal processor, comprising:

two or more observation means for receiving a reflected wave from a target as a received signal through a receiving antenna and for outputting a predetermined observation signal;

means for extracting distance component corresponding to a distance from said receiving antenna from said each observation signal;

means for estimating correlation matrix with exponential smoothing, for collecting respective said extracted distance components and for computing and estimating an estimated value of a correlation matrix corresponding to said respective distance components with a forgetting factor corresponding to said each distance component as a parameter by a method for estimating correlation matrix with exponential smoothing;

means for estimating presence and movement state of target on the basis of said respective estimated values of said correlation matrices which were estimated; and means for determining forgetting factor depending on distance, for respectively computing and determining said forgetting factors corresponding to said distances from said receiving antennas, and for respectively outputting said computed and determined forgetting factors as said forgetting factors corresponding to said respective distance components to said means for estimating correlation matrix with exponential smoothing.

According to this aspect of the invention, the forgetting factor $\alpha$ which is a parameter for the S/N improvement and the transient response in the estimation of a correlation matrix can be set, depending on distances. If a target at a distance (rq) is known in advance to strongly move, therefore, transient responsibility in estimation of a correlation matrix can be improved by setting the forgetting factor ($\alpha q$) in the distance smaller than the other forgetting factors in order to follow the movement of the target, so that the correlation matrix can be properly estimated.

Another aspect of the invention is a radar signal processor, comprising:

two or more observation means for receiving a reflected wave from a target as a received signal through a receiving antenna and for outputting a predetermined observation signal;

means for extracting a distance component corresponding to a distance from said receiving antenna from said each observation signal;

means for estimating correlation matrix with exponential smoothing, for collecting respective said extracted distance components and for computing and estimating an estimated value of a correlation matrix corresponding to said respective distance components with a forgetting factor corresponding to said each distance component as a parameter by a method for estimating correlation matrix with exponential smoothing;

means for estimating presence and movement state of target on the basis of said respective estimated values of said correlation matrices which were estimated; and means for determining forgetting factor depending on distance attenuation, for respectively computing and determining said forgetting factors corresponding to said distances from said receiving antennas according to an attenuation of said reflected wave due to said distance, and for respectively outputting said computed and determined forgetting factors as said forgetting factors corresponding to said respective distance components to said means for estimating correlation matrix with exponential smoothing.

According to this aspect of the invention, the forgetting factor $\alpha$ which is a parameter for the S/N improvement in the estimation of a correlation matrix can be made big according to the attenuation of reflected waves due to distance. Then, the influence of lowering of the S/N rate in the input of the reflected wave from the distant target due to the distance attenuation is improved, so that the correlation matrix can be properly estimated.

Another aspect of the invention is a radar signal processor, comprising:

two or more observation means for receiving a reflected wave from a target as a received signal through a receiving antenna and for outputting a predetermined observation signal;

range discrete Fourier Transform means, for respectively computing and extracting components of respective frequencies corresponding to said distance from said receiving antenna by discrete Fourier transform means on the basis of said observation signal;

means for estimating correlation matrix with exponential smoothing, for collecting respective said extracted components of respective frequencies corresponding to said distances from said receiving antennas, and for computing and estimating an estimated value of a correlation matrix for said distance corresponding to said each frequency with a forgetting factor corresponding to said each distance as a parameter by a method for estimating correlation matrix with exponential smoothing;

means for estimating a presence of a target or a movement state of said target on the basis of said respective estimated values of said correlation matrices which were estimated; and means for determining forgetting factor depending on distance, for respectively computing and determining said forgetting factors corresponding to said distances from said receiving antennas, and for respectively outputting said computed and determined forgetting factors as said forgetting factors corresponding to said respective distance components to said means for estimating correlation matrix with exponential smoothing.

According to this aspect of the invention, the forgetting factor α which is a parameter for the S/N improvement and the transient response in the estimation of a correlation matrix can be set, depending on distances in a FM-CW radar, so that the correlation matrix can be properly estimated.

Another aspect of the invention is a radar signal processor, comprising:

two or more observation means for receiving a reflected wave from a target as a received signal through a receiving antenna and for outputting a predetermined observation signal;

range discrete Fourier Transform means, for respectively computing and extracting components of respective frequencies corresponding to said distance from said receiving antenna by discrete Fourier transform means on the basis of said observation signal;

means for estimating correlation matrix with exponential smoothing, for collecting respective said extracted components of respective frequencies corresponding to said distance from said receiving antenna, and for computing and estimating an estimated value of a correlation matrix for said distance corresponding to said each frequency with a forgetting factor corresponding to said each distance as a parameter by a method for estimating correlation matrix with exponential smoothing;

means for estimating presence and movement state of target on the basis of said respective estimated values of said correlation matrices which were estimated; and means for determining forgetting factor depending on distance attenuation, for respectively computing and determining said forgetting factors corresponding to said distances from said receiving antennas according to an attenuation of said reflected wave due to said distance, and for respectively outputting said computed and determined forgetting factors as said forgetting factors corresponding to said respective distance components to said means for estimating correlation matrix with exponential smoothing.

According to this aspect of the invention, the forgetting factor α which is a parameter for the S/N improvement in the estimation of a correlation matrix can be made big according to the attenuation of reflected waves due to distance in a FM-CW radar Then, the influence by lowering of the S/N rate in the input of the reflected wave from the distant target due to the distance attenuation is improved, so that the correlation matrix can be properly estimated.

Another aspect of the invention is a radar signal processor, comprising:

two or more observation means for receiving a reflected wave from a target as a received signal through a receiving antenna and for outputting a predetermined observation signal;

means for extracting distance component corresponding to a distance from said receiving antenna from said each observation signal;

means for estimating correlation matrix with section average, for collecting respective said extracted distance components and for computing and estimating a first estimated value of a correlation matrix corresponding to said respective distance components by a method for estimating correlation matrix with section average;

means for estimating correlation matrix with exponential smoothing, for computing and estimating a second estimated value of a correlation matrix corresponding to said respective distance components with a forgetting factor corresponding to said each distance component as a parameter by a method for estimating correlation matrix with exponential smoothing from said first estimated value of said correlation matrix which was estimated;

means for estimating presence and movement state of target on the basis of said second estimated value of said correlation matrix which was estimated; and means for determining forgetting factor depending on distance, for respectively computing and determining said forgetting factors corresponding to said distances from said receiving antennas, and for respectively outputting said computed and determined forgetting factors as said forgetting factors corresponding to said respective distance components to said means for estimating correlation matrix with exponential smoothing.

According to this aspect of the invention, in the array radar apparatus which has means for estimating correlation matrix for estimating with section average and exponential smoothing in order, the forgetting factor α which is a parameter for the S/N improvement and the transient response in the estimation of a correlation matrix can be set, depending on distances.

Another aspect of the invention is a radar signal processor, comprising:

two or more observation means for receiving a reflected wave from a target as a received signal through a receiving antenna and for outputting a predetermined observation signal;

means for extracting a distance component corresponding to a distance from said receiving antenna from said each observation signal;

means for estimating correlation matrix with exponential smoothing, for collecting respective said extracted distance components and for computing and estimating an estimated value of a correlation matrix corresponding to said respective distance components with a forgetting factor as a parameter by a method for estimating correlation matrix with exponential smoothing;

means for estimating presence and movement state of target on the basis of said respective estimated values of said correlation matrices which were estimated;

a ones own vehicle sensor, for sensing a movement state of ones own vehicle and for outputting the sensed as ones own vehicle movement state information; and means for determining forgetting factor, for respectively computing and determining said forgetting factors on the basis of said ones own vehicle movement state information and for outputting said computed and determined forgetting factors to said means for estimating correlation matrix with exponential smoothing.

According to this aspect of the invention, the forgetting factor α which is a parameter for the S/N improvement and the transient response in the estimation of a correlation matrix can be set according to a movement state of ones own vehicle, so that the correlation matrix can be properly estimated.

Another aspect of the invention is a radar signal processor, wherein said ones own vehicle sensor senses a turning state of ones own vehicle, and outputs ones own vehicle turning state information obtained as said ones own vehicle movement state information.

According to this aspect of the invention, the forgetting factor α which is a parameter for the S/N improvement and the transient response in the estimation of a correlation matrix can be set according to a turning state of ones own vehicle, so that the correlation matrix can be properly estimated.

Another aspect of the invention is a radar signal processor, wherein said ones own vehicle sensor has means for judging turning/non-turning for determining whether ones own vehicle is turning or not and for outputting a result as said ones own vehicle movement state information, and wherein said means for determining forgetting factor has means for determining forgetting factor on turning state, for computing and determining said forgetting factor which has a low value if ones own vehicle is turning, and computing and determining said forgetting factor which has a high value if ones own vehicle is not turning on the basis of said ones own vehicle movement state information.

According to this aspect of the invention, a high transient responsibility in the estimation of a correlation matrix which is required at the time of turning can be achieved by making the forgetting factor $\alpha$ small, and a high S/N improvement in the estimation of a correlation matrix which is required at the time of non-turning can be achieved by making the forgetting factor $\alpha$ high, so that the correlation matrix can be properly estimated.

Another aspect of the invention is a radar signal processor, comprising:

two or more observation means for receiving a reflected wave from a target as a received signal through a receiving antenna and for outputting a predetermined observation signal;

means for extracting a distance component corresponding to a distance from said receiving antenna from said each observation signal;

means for estimating correlation matrix with exponential smoothing, for collecting respective said extracted distance components and for computing and estimating an estimated value of a correlation matrix corresponding to said respective distance components with a forgetting factor as a parameter by a method for estimating correlation matrix with exponential smoothing;

means for estimating presence of a target or a movement state of said target on the basis of said respective estimated values of said correlation matrices which were estimated;

a steering sensor, for detecting an actual angle of a steering of ones own vehicle and for outputting the detected angle as ones own vehicle turning state information; and means for determining forgetting factor, for respectively computing and determining said forgetting factors on the basis of said ones own vehicle turning state information, and for respectively outputting said computed and determined forgetting factors to said means for estimating correlation matrix with exponential smoothing.

According to this aspect of the invention, the forgetting factor $\alpha$ which is a parameter for the S/N improvement and the transient response in the estimation of a correlation matrix can be set according to a turning state of ones own vehicle with the steering sensor which can be easily mounted, so that the correlation matrix can be properly estimated according to the steering state.

Another aspect of the invention is a radar signal processor, comprising:

two or more observation means for receiving a reflected wave from a target as a received signal through a receiving antenna and for outputting a predetermined observation signal;

means for extracting a distance component corresponding to a distance from said receiving antenna from said each observation signal;

means for estimating correlation matrix with exponential smoothing, for collecting respective said extracted distance components and for computing and estimating an estimated value of a correlation matrix corresponding to said respective distance components with a forgetting factor as a parameter by a method for estimating correlation matrix with exponential smoothing;

means for estimating presence of a target or a movement state of said target on the basis of said respective estimated values of said correlation matrices which were estimated;

a Yaw Rate sensor, for measuring a turning angle of ones own vehicle and for outputting the measured angle as ones own vehicle turning state information; and means for determining forgetting factor, for respectively computing and determining said forgetting factors on the basis of said ones own vehicle turning state information, and for respectively outputting said computed and determined forgetting factors to said means for estimating correlation matrix with exponential smoothing.

According to this aspect of the invention, the forgetting factor $\alpha$ which is a parameter for the S/N improvement and the transient response in the estimation of a correlation matrix can be set according to a turning state of ones own vehicle with the Yaw Rate sensor which can be easily mounted, so that the correlation matrix can be properly estimated according to the turning state of ones own vehicle.

Another aspect of the invention is a radar signal processor, comprising:

two or more observation means for receiving a reflected wave from a target as a received signal through a receiving antenna and for outputting a predetermined observation signal;

means for extracting a distance component corresponding to a distance from said receiving antenna from said each observation signal;

means for estimating correlation matrix with exponential smoothing, for collecting respective said extracted distance components and for computing and estimating an estimated value of a correlation matrix corresponding to said respective distance components with a forgetting factor as a parameter by a method for estimating correlation matrix with exponential smoothing;

means for estimating presence of a target or a movement state of said target on the basis of said respective estimated values of said correlation matrices which were estimated;

a vehicle speed sensor, for sensing a vehicle speed of ones own vehicle and for outputting the sensed speed as vehicle speed information; and means for determining forgetting factor, for respectively computing and determining said forgetting factors on the basis of said vehicle speed information, and for respectively outputting said computed and determined forgetting factors to said means for estimating correlation matrix with exponential smoothing.

According to this aspect of the invention, the forgetting factor $\alpha$ which is a parameter for the S/N improvement and the transient response in the estimation of a correlation matrix can be set according to the vehicle speed of ones own vehicle, so that the correlation matrix can be properly estimated according to the speed of ones own vehicle.

Another aspect of the invention is a radar signal processor, wherein said vehicle speed sensor has means for judging vehicle speed, for determining whether ones own vehicle is running at a high speed or a low speed and for outputting vehicle speed information, and wherein said means for determining forgetting factor has means for determining forgetting factor on vehicle speed, for computing and determining said forgetting factor which has a small value if said vehicle speed which said vehicle speed information shows is high, and computing and determining said forgetting factor which has a high value if said vehicle speed which said vehicle speed information shows is low.

According to this aspect of the invention, a high transient responsibility in the estimation of a correlation matrix which is required at the time of high speed can be achieved by making the forgetting factor $\alpha$ small, and a high S/N improvement in the estimation of a correlation matrix which is required at the time of low speed can be achieved by making the forgetting factor $\alpha$ high, so that the correlation matrix can be properly estimated.

Another aspect of the invention is radar signal processor, comprising:

two or more observation means for receiving a reflected wave from a target as a received signal through a receiving antenna and for outputting a predetermined observation signal;

means for extracting a distance component corresponding to a distance from said receiving antenna from said each observation signal;

means for estimating correlation matrix with section average, for collecting respective said extracted distance components and for computing and estimating a first estimated value of a correlation matrix corresponding to said respective distance components by a method for estimating correlation matrix with section average;

means for estimating correlation matrix with exponential smoothing, for computing and estimating a second estimated value of a correlation matrix corresponding to said respective distance components with a forgetting factor as a parameter by a method for estimating correlation matrix with exponential smoothing from said first estimated value of said correlation matrix which was estimated;

means for estimating presence of a target or a movement state of said target on the basis of said second estimated value of said correlation matrix which was estimated;

a ones own vehicle sensor, for sensing a movement state of ones own vehicle and for outputting the sensed state as ones own vehicle movement state information; and means for determining forgetting factor, for respectively computing and determining said forgetting factors on the basis of said ones own vehicle movement state information and for outputting said computed and determined forgetting factors to said means for estimating correlation matrix with exponential smoothing.

According to this aspect of the invention, in the array radar apparatus which has means for estimating correlation matrix for estimating with section average and exponential smoothing in order, the forgetting factor $\alpha$ which is a parameter for the S/N improvement and the transient response in the estimation of a correlation matrix can be set according to the movement state of ones own vehicle, so that the correlation matrix can be properly estimated.

Another aspect of the invention is a radar signal processor, comprising:

two or more observation means for receiving a reflected wave from a target as a received signal through a receiving antenna and for outputting a predetermined observation signal;

means for extracting a distance component corresponding to a distance from said receiving antenna from said each observation signal;

means for estimating correlation matrix with exponential smoothing, for collecting respective said extracted distance components and for computing and estimating an estimated value of a correlation matrix corresponding to said respective distance components with a forgetting factor as a parameter by a method for estimating correlation matrix with exponential smoothing;

means for estimating a presence of a target or a movement state of said target on the basis of said respective estimated values of said correlation matrices which were estimated;

means for obtaining surroundings of ones own vehicle and for outputting the obtained as information on surroundings of ones own vehicle; and means for determining forgetting factor, for respectively computing and determining said forgetting factors on the basis of said information on surroundings of ones own vehicle, and for respectively outputting said computed and determined forgetting factors to said means for estimating correlation matrix with exponential smoothing.

According to this aspect of the invention, the forgetting factor $\alpha$ which is a parameter for the S/N improvement and the transient response in the estimation of a correlation matrix can be set according to the surroundings of ones own vehicle, so that the correlation matrix can be properly estimated.

Another aspect of the invention is a radar signal processor, wherein said means for obtaining surroundings of ones own vehicle has means for obtaining information on speed limit of a road where ones own vehicle is running and for outputting said obtained speed limit as said information on surroundings of ones own vehicle.

According to this aspect of the invention, the forgetting factor $\alpha$ which is a parameter for the S/N improvement and the transient response in the estimation of a correlation matrix can be set according to the speed limit, so that the correlation matrix can be properly estimated.

Another aspect of the invention is a radar signal processor, wherein said means for obtaining surroundings of ones own vehicle has means for judging speed limit, for judging as high speed limit if said speed limit of a road where ones own vehicle is running is higher than a predetermined value, and judging as low speed limit if said speed limit of said road where said own vehicle is running is lower than said predetermined value, and for outputting said judged high/low speed limit as said information on surroundings of ones own vehicle, and wherein said means for determining forgetting factor has means for determining forgetting factor on speed limit, for computing and determining said forgetting factor which has a low value if said speed limit of said road where ones own vehicle is running is high, and computing and determining said forgetting factor which has a high value if said speed limit of said road where said ones own vehicle is running is low on the basis of said information on surroundings of ones own vehicle.

According to this aspect of the invention, a high transient responsibility in the estimation of a correlation matrix which is required for surroundings where the speed limit is high, such as a highway, can be achieved by making the forgetting factor $\alpha$ small, and a high S/N improvement in the estimation of a correlation matrix which is required for surroundings where the speed limit is low, such as an ordinary road, can be achieved by making the forgetting factor $\alpha$ high, so that the correlation matrix can be properly estimated.

Another aspect of the invention is a radar signal processor, wherein said means for obtaining information on speed limit has car navigation means for obtaining a present position of ones own vehicle, and for obtaining said speed limit of said present position from map information which is stored in advance.

According to this aspect of the invention, the forgetting factor α which is a parameter for the S/N improvement and the transient response in the estimation of a correlation matrix can be set according to the speed limit with the car navigation which can be easily mounted, so that the correlation matrix can be properly estimated.

Another aspect of the invention is a radar signal processor, comprising:
  two or more observation means for receiving a reflected wave from a target as a received signal through a receiving antenna and for outputting a predetermined observation signal;
  means for extracting a distance component corresponding to a distance from said receiving antenna from said each observation signal;
  means for estimating correlation matrix with section average, for collecting respective said extracted distance components and for computing and estimating a first estimated value of a correlation matrix corresponding to said respective distance components by a method for estimating correlation matrix with section average;
  means for estimating correlation matrix with exponential smoothing, for computing and estimating a second estimated value of a correlation matrix corresponding to said respective distance components with a forgetting factor as a parameter by a method for estimating correlation matrix with exponential smoothing from said first estimated value of said correlation matrix which was estimated;
  means for estimating presence of a target or a movement state of said target on the basis of said second estimated value of said correlation matrix which was estimated;
  means for obtaining surroundings of ones own vehicle, for obtaining surroundings of ones own vehicle and for outputting the obtained as information on surroundings of ones own vehicle; and
  means for determining forgetting factor, for respectively computing and determining said forgetting factors on the basis of said information on surroundings of ones own vehicle and for outputting said computed and determined forgetting factors to said means for estimating correlation matrix with exponential smoothing.

According to this aspect of the invention, in the array radar apparatus which has means for estimating correlation matrix for estimating with section average and exponential smoothing in order, the forgetting factor α which is a parameter for the S/N improvement and the transient response in the estimation of a correlation matrix can be set according to the surroundings of ones own vehicle, so that the correlation matrix can be properly estimated.

Another aspect of the invention is a radar signal processor, comprising:
  two or more observation means for receiving a reflected wave from a target as a received signal through a receiving antenna and for outputting a predetermined observation signal;
  means for extracting a distance component corresponding to a distance from said receiving antenna from said each observation signal;
  means for estimating correlation matrix with exponential smoothing, for collecting respective said extracted distance components and for computing and estimating an estimated value of a correlation matrix corresponding to said respective distance components with a forgetting factor as a parameter by a method for estimating correlation matrix with exponential smoothing;
  means for estimating a presence of a target or a movement state of said target on the basis of said respective estimated values of said correlation matrices which were estimated;
  means for obtaining radio wave state of surroundings of ones own vehicle from said received signal which was received by said receiving antenna, and for outputting the obtained as information on radio wave state; and
  means for determining forgetting factor, for respectively computing and determining said forgetting factors on the basis of said information on radio wave state, and for respectively outputting said computed and determined forgetting factors to said means for estimating correlation matrix with exponential smoothing.

According to this aspect of the invention, the forgetting factor α which is a parameter for the S/N improvement and the transient response in the estimation of a correlation matrix can be set according to the radio wave state, so that the correlation matrix can be properly estimated.

Another aspect of the invention is a radar signal processor, wherein said means for obtaining radio wave state has means for computing interference, for computing and obtaining an interference influence due to waves excluding said signals transmitted from said observation means from said received signal, and for outputting said computed and obtained as said information on radio wave state.

According to this aspect of the invention, the forgetting factor α which is a parameter for the S/N improvement and the transient response in the estimation of a correlation matrix can be set according to the interference influence, so that the correlation matrix can be properly estimated.

Another aspect of the invention is the radar signal processor, wherein said means for determining forgetting factor has means for determining forgetting factor on interference influence, for computing and determining said forgetting factor as zero (0) if an interference influence in said information on radio wave state is higher than a predetermined threshold value.

According to this aspect of the invention, if the interference influence is big, the estimated value of the correlation matrix which received the interference influence can be reset by making the forgetting factor α zero (0), so that the correlation matrix can be properly estimated.

Another aspect of the invention is a radar signal processor, comprising:
  two or more observation means for receiving a reflected wave from a target as a received signal through a receiving antenna and for outputting a predetermined observation signal;
  means for extracting a distance component corresponding to a distance from said receiving antenna from said each observation signal;
  means for estimating correlation matrix with section average, for collecting respective said extracted distance components and for computing and estimating a first estimated value of a correlation matrix corresponding to said respective distance components by a method for estimating correlation matrix with section average;
  means for estimating correlation matrix with exponential smoothing, for computing and estimating a second estimated value of a correlation matrix corresponding to said respective distance components with a forgetting factor as a parameter by a method for estimating correlation matrix with exponential smoothing from said first estimated value of said correlation matrix which was estimated;

means for estimating a presence of a target or a movement state of said target on the basis of said second estimated value of said correlation matrix which was estimated;

means for obtaining radio wave state of surroundings of ones own vehicle from said received signal received by said receiving antenna and for outputting the obtained as information on radio wave state; and means for determining forgetting factor, for respectively computing and determining said forgetting factors on the basis of said information on radio wave state and for outputting said computed and determined forgetting factors to said means for estimating correlation matrix with exponential smoothing.

According to this aspect of the invention, in the array radar apparatus which has means for estimating correlation matrix for estimating with section average and exponential smoothing in order, the forgetting factor α which is a parameter for the S/N improvement and the transient response in the estimation of a correlation matrix can be set according to the radio wave state, so that the correlation matrix can be properly estimated.

Another aspect of the invention is a radar signal processor, comprising:

two or more observation means for receiving a reflected wave from a target as a received signal through a receiving antenna and for outputting a predetermined observation signal;

means for estimating correlation matrix with exponential smoothing, for computing and estimating an estimated value of a correlation matrix corresponding to said observation signal on the basis of said each observation signal with a forgetting factor as a parameter by a method for estimating correlation matrix with exponential smoothing;

means for estimating a presence of a target or a movement state of said target on the basis of said respective estimated values of said correlation matrices which were estimated;

a ones own vehicle sensor, for sensing a movement state of ones own vehicle and for outputting the sensed movement state as ones own vehicle movement state information; and means for determining forgetting factor, for respectively computing and determining said forgetting factors on the basis of said ones own vehicle movement state information and for outputting said computed and determined forgetting factors to said means for estimating correlation matrix with exponential smoothing.

According to this aspect of the invention, the forgetting factor α which is a parameter for the S/N improvement and the transient response in the estimation of a correlation matrix can be set according to the movement state of ones own vehicle, so that the correlation matrix can be properly estimated.

Another aspect of the invention is a radar signal processor, comprising:

two or more observation means for receiving a reflected wave from a target as a received signal through a receiving antenna and for outputting a predetermined observation signal;

means for estimating correlation matrix with section average, for computing and estimating a first estimated value of a correlation matrix corresponding to said observation signal on the basis of said each observation signal by a method for estimating correlation matrix with section average;

means for estimating correlation matrix with exponential smoothing, for computing and estimating a second estimated value of a correlation matrix from said first estimated value of said correlation matrix which was estimated with a forgetting factor as a parameter by a method for estimating correlation matrix with exponential smoothing;

means for estimating a presence of a target or a movement state of said target on the basis of said second estimated value of said correlation matrix which was estimated;

a ones own vehicle sensor, for sensing a movement state of ones own vehicle and for outputting the sensed movement state as ones own vehicle movement state information; and means for determining forgetting factor, for respectively computing and determining said forgetting factors on the basis of said ones own vehicle movement state information and for outputting said computed and determined forgetting factors to said means for estimating correlation matrix with exponential smoothing.

According to this aspect of the invention, in the array radar apparatus which has means for estimating correlation matrix for estimating with section average and exponential smoothing in order, the forgetting factor α which is a parameter for the S/N improvement and the transient response in the estimation of a correlation matrix can be set according to the movement state of ones own vehicle, so that the correlation matrix can be properly estimated.

Another aspect of the invention is a radar signal processor, comprising:

two or more observation means for receiving a reflected wave from a target as a received signal through a receiving antenna and for outputting a predetermined observation signal;

means for estimating correlation matrix with exponential smoothing, for computing and estimating an estimated value of a correlation matrix corresponding to said observation signal on the basis of said each observation signal with a forgetting factor as a parameter by a method for estimating correlation matrix with exponential smoothing;

means for estimating a presence of a target or a movement state of said target on the basis of said respective estimated values of said correlation matrices which were estimated;

means for obtaining surroundings of ones own vehicle and for outputting the obtained information as information on surroundings of ones own vehicle; and means for determining forgetting factor, for respectively computing and determining said forgetting factors on the basis of said information on surroundings of ones own vehicle and for outputting said computed and determined forgetting factors to said means for estimating correlation matrix with exponential smoothing.

According to this aspect of the invention, the forgetting factor α which is a parameter for the S/N improvement and the transient response in the estimation of a correlation matrix can be set according to the surroundings of ones own vehicle, so that the correlation matrix can be properly estimated.

Another aspect of the invention is a radar signal processor, comprising:

two or more observation means for receiving a reflected wave from a target as a received signal through a receiving antenna and for outputting a predetermined observation signal;

means for estimating correlation matrix with section average, for computing and estimating a first estimated value of a correlation matrix corresponding to said observation signal on the basis of said each observation signal by a method for estimating correlation matrix with section average;

means for estimating correlation matrix with exponential smoothing, for computing and estimating a second estimated value of a correlation matrix from said first estimated value of said correlation matrix which was estimated with a forgetting factor as a parameter by a method for estimating correlation matrix with exponential smoothing;

means for estimating a presence of a target or a movement state of said target on the basis of said second estimated value of said correlation matrix which was estimated;

means for obtaining surroundings of ones own vehicle and for outputting the obtained information as information on surroundings of ones own vehicle; and means for determining forgetting factor, for respectively computing and determining said forgetting factors on the basis of said information on surroundings of ones own vehicle and for outputting said computed and determined forgetting factors to said means for estimating correlation matrix with exponential smoothing.

According to this aspect of the invention, in the array radar apparatus which has means for estimating correlation matrix for estimating with section average and exponential smoothing in order, the forgetting factor $\alpha$ which is a parameter for the S/N improvement and the transient response in the estimation of a correlation matrix can be set according to the surroundings of ones own vehicle, so that the correlation matrix can be properly estimated.

Another aspect of the invention is radar signal processor, comprising:

two or more observation means for receiving a reflected wave from a target as a received signal through a receiving antenna and for outputting a predetermined observation signal;

means for estimating correlation matrix with exponential smoothing, for computing and estimating an estimated value of a correlation matrix corresponding to said observation signal on the basis of said each observation signal with a forgetting factor as a parameter by a method for estimating correlation matrix with exponential smoothing;

means for estimating a presence of a target or a movement state of said target on the basis of said respective estimated values of said correlation matrices which were estimated;

means for obtaining a radio wave state of surroundings of ones own vehicle from said received signal received from said receiving antenna and for outputting the obtained state as information on radio wave state; and means for determining forgetting factor, for respectively computing and determining said forgetting factors on the basis of said information on radio wave state and for outputting said computed and determined forgetting factors to said means for estimating correlation matrix with exponential smoothing.

According to this aspect of the invention, the forgetting factor $\alpha$ which is a parameter for the S/N improvement and the transient response in the estimation of a correlation matrix can be set according to the radio wave state, so that the correlation matrix can be properly estimated.

Another aspect of the invention is radar signal processor, comprising:

two or more observation means for receiving a reflected wave from a target as a received signal through a receiving antenna and for outputting a predetermined observation signal;

means for estimating correlation matrix with section average, for computing and estimating a first estimated value of a correlation matrix corresponding to said observation signal on the basis of said each observation signal by a method for estimating correlation matrix with section average;

means for estimating correlation matrix with exponential smoothing, for computing and estimating a second estimated value of a correlation matrix from said first estimated value of said correlation matrix which was estimated with a forgetting factor as a parameter by a method for estimating correlation matrix with exponential smoothing;

means for estimating presence of a target or a movement state of said target on the basis of said second estimated value of said correlation matrix which was estimated;

means for obtaining radio wave state of surroundings of ones own vehicle from said received signal received from said receiving antenna and for outputting the obtained state as information on radio wave state; and means for determining forgetting factor, for respectively computing and determining said forgetting factors on the basis of said information on radio wave state and for outputting said computed and determined forgetting factors to said means for estimating correlation matrix with exponential smoothing.

According to this aspect of the invention, in the array radar apparatus which has means for estimating correlation matrix for estimating with section average and exponential smoothing in order, the forgetting factor $\alpha$ which is a parameter for the S/N improvement and the transient response in the estimation of a correlation matrix can be set according to the radio wave state, so that the correlation matrix can be properly estimated.

Another aspect of the invention is a radar signal processor, wherein said means for obtaining surroundings of ones own vehicle has means for judging information on road division, for determining whether a road where ones own vehicle is running is a highway or an ordinary road, and for outputting the determined result as information on surroundings of ones own vehicle.

According to this aspect of the invention, the forgetting factor $\alpha$ which is a parameter for the S/N improvement and the transient response in the estimation of a correlation matrix can be set according to the road division, a highway or an ordinary road, so that the correlation matrix can be properly estimated.

Another aspect of the invention is a radar signal processor, wherein said means for determining forgetting factor has means for determining forgetting factor on road kind, for computing and determining said forgetting factor which has a low value if said road where ones own vehicle is running is a highway, and computing and determining said forgetting factor which has a high value if said road where ones own vehicle is running is an ordinary road on the basis of said information on surroundings of ones own vehicle.

According to this aspect of the invention, a high transient responsibility in the estimation of a correlation matrix which is required for a highway where the speed limit is high can be achieved by making the forgetting factor α small, and a high S/N improvement in the estimation of a correlation matrix which is required for an ordinary road where the speed limit is low can be achieved by making the forgetting factor α high, so that the correlation matrix can be properly estimated.

Another aspect of the invention is a radar signal processor, comprising:

two or more observation means for receiving a reflected wave from a target as a received signal through a receiving antenna and for outputting a predetermined observation signal;

means for extracting a distance component corresponding to a distance from said receiving antenna from said each observation signal;

means for estimating correlation matrix with exponential smoothing, for collecting respective said extracted distance components and for computing and estimating an estimated value of a correlation matrix corresponding to said respective distance components with a forgetting factor as a parameter by a method for estimating correlation matrix with exponential smoothing;

means for estimating a presence of a target or a movement state of said target on the basis of said respective estimated values of said correlation matrices which were estimated;

means for setting target to be searched, for selectively setting a kind of said target to be searched, and for outputting a corresponding search kind signal; and means for determining forgetting factor, for respectively computing and determining said forgetting factors on the basis of said search kind signal, and for outputting said computed and determined forgetting factors to said means for estimating correlation matrix with exponential smoothing.

According to this aspect of the invention, the forgetting factor α which is a parameter for the S/N improvement and the transient response in the estimation of a correlation matrix can be set according to kinds of the targets to be searched, so that the correlation matrix can be properly estimated.

DESCRIPTION OF THE PREFERRED EMBODIMENTS

A radar signal processor 12 according to the invention has observation means 1 through K denoted with reference numerals OB, means for respectively extracting distance components 1 through K denoted with reference numerals DS, means for respectively estimating correlation matrices with exponential smoothing 1 through N denoted with reference numerals RM, means for estimating presence and movement state of target denoted with a reference numeral OM, and means for determining forgetting factor depending on distance denoted with a reference numeral FF, as shown in FIG. 1.

Figure 2:
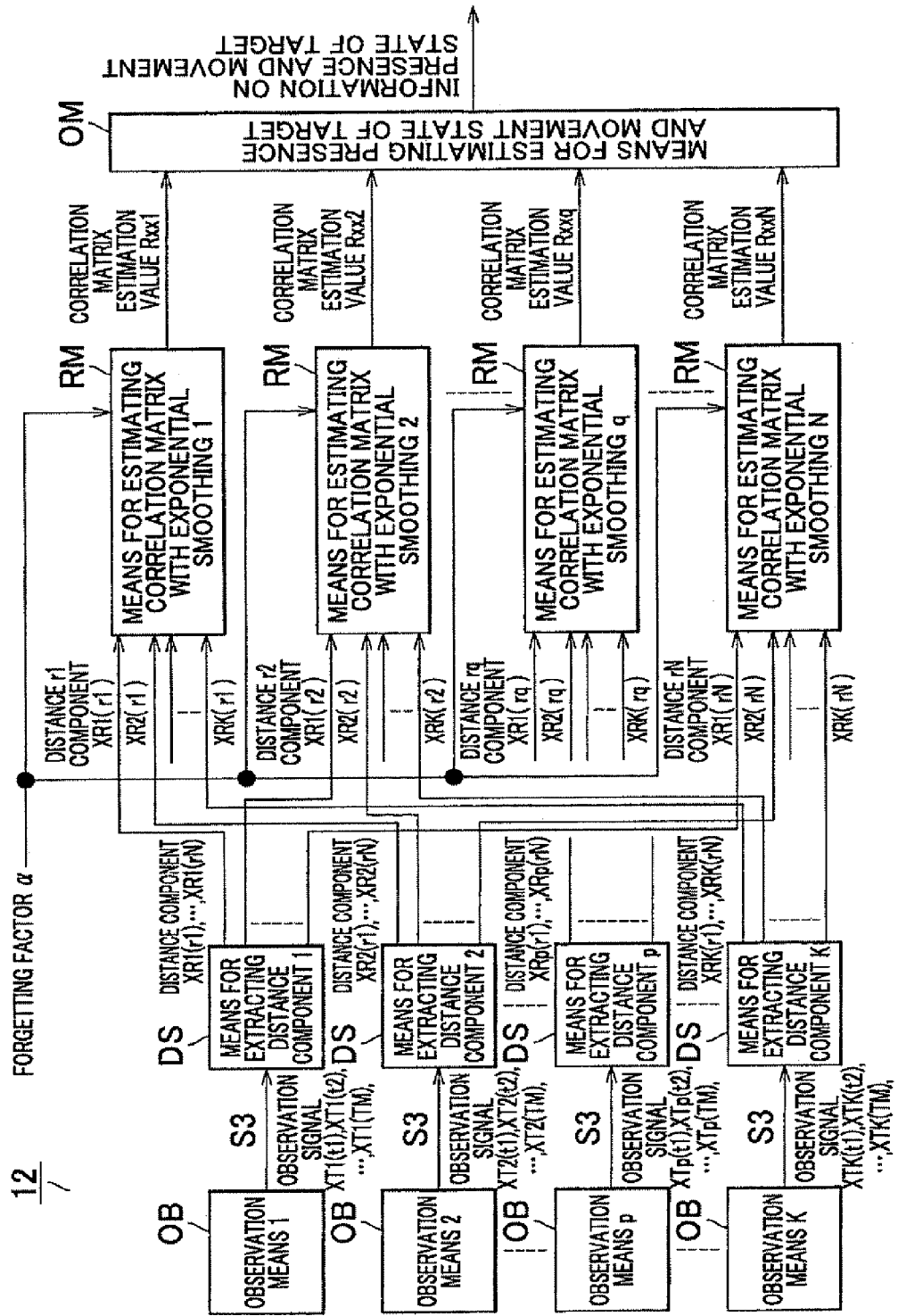
FIG. 2 is a block diagram showing a schematic structure of a conventional vehicle-mounted array radar apparatus.
Figure 3:
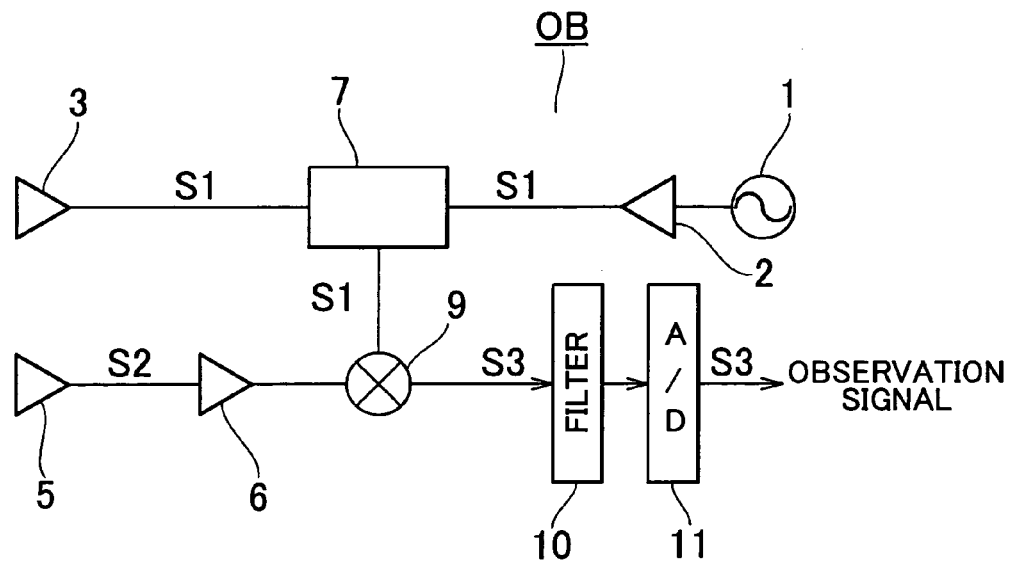
FIG. 3 is a view showing a structure of a FM-CW radar which is an example of an observation means.
Figure 4:
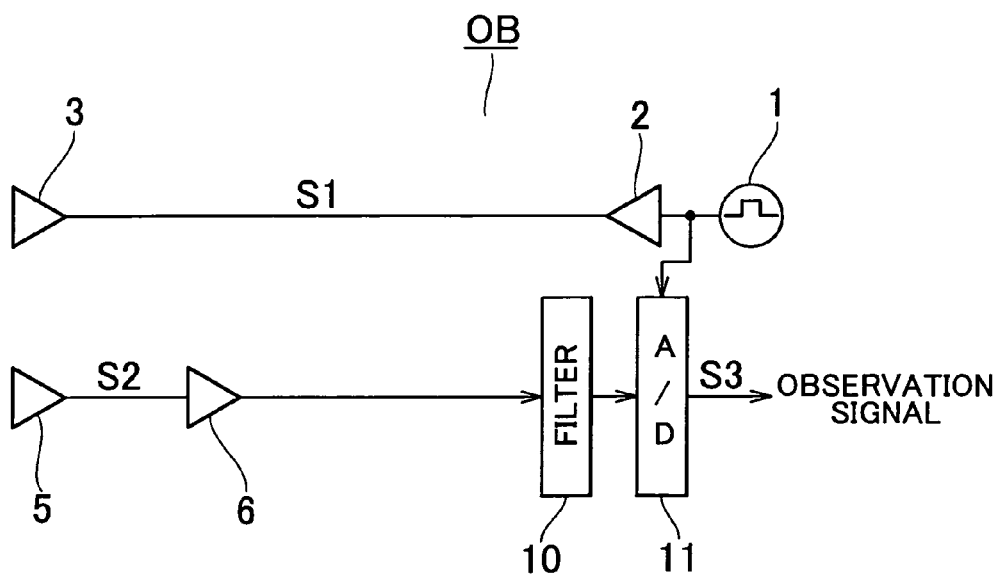
FIG. 4 is a view showing a structure of a pulse radar which is another example of the observation means.
Figure 5:
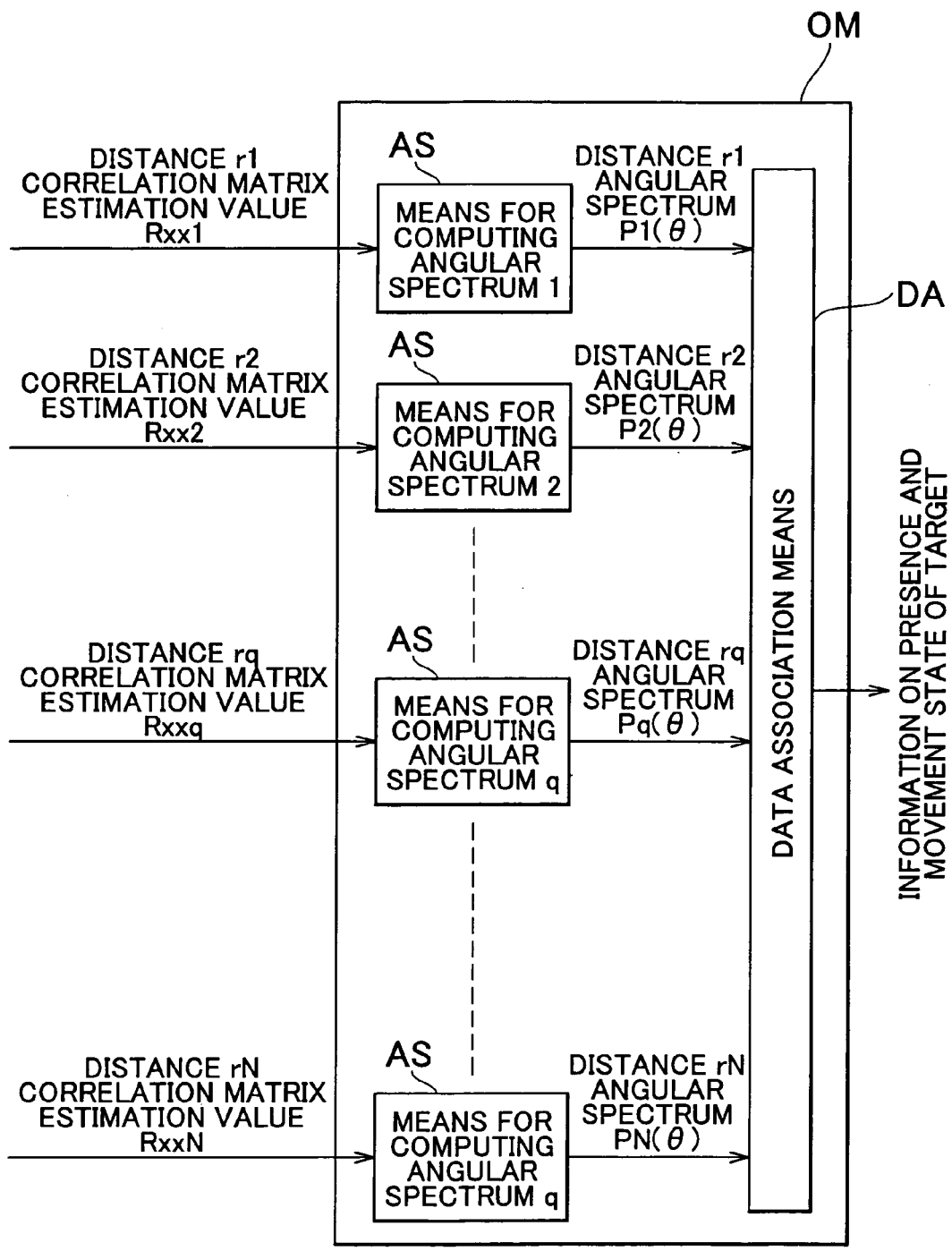
FIG. 5 is a block diagram showing a schematic structure of an example of means for estimating presence and movement state of target.
Figure 6:
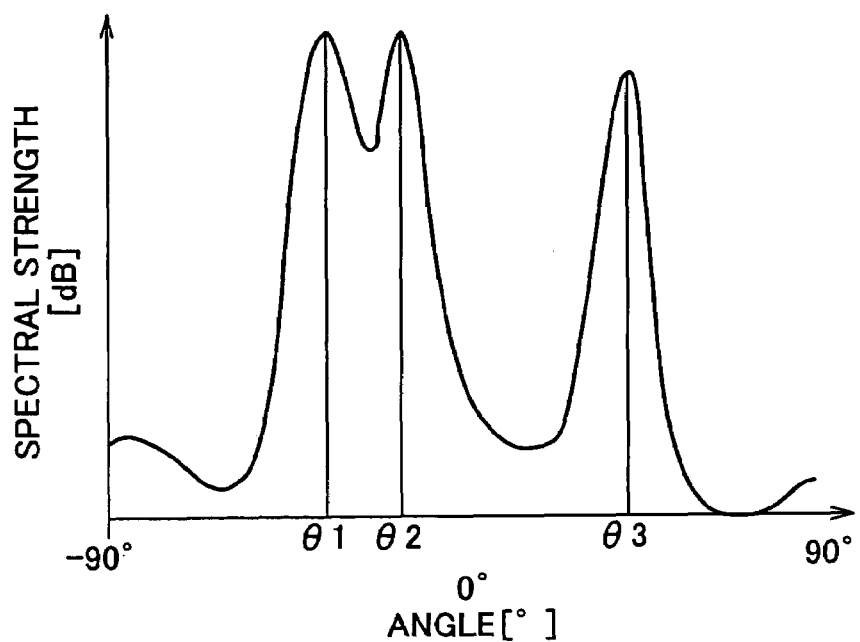
FIG. 6 is a view showing an example of an angular spectrum in which there are one or more target(s)
Figure 7:
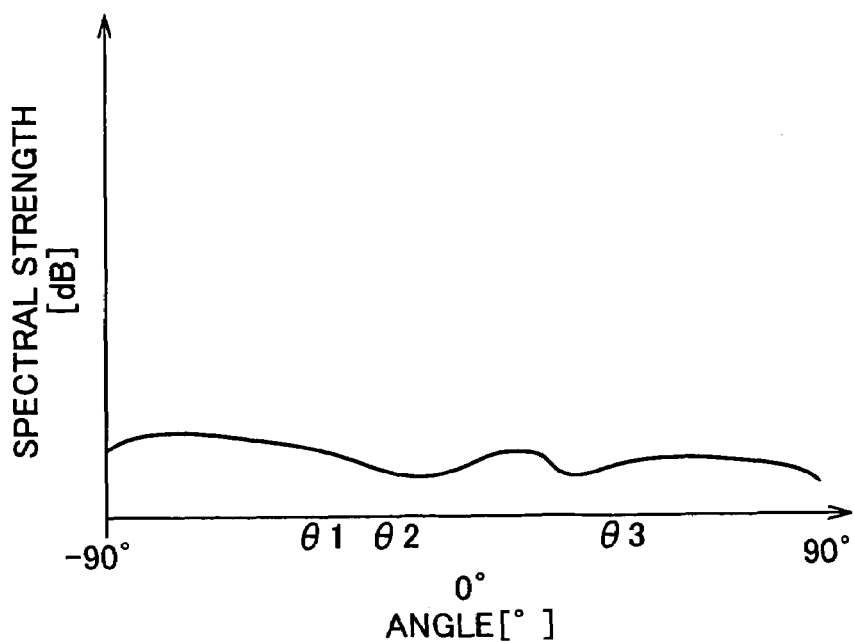
FIG. 7 is a view showing an example of an angular spectrum when there is no target.

Explanations of the observation means p (array components p=1, 2, . . . K), the means for extracting distance component p (array components p=1, 2, . . . K) and means for estimating presence and movement state of target OM are omitted since these means are similar to those of the conventional array radar apparatus as shown in FIG. 2.

The means for determining forgetting factor depending on distance FF independently determines forgetting factors α1, . . . αN, corresponding to distances r1, . . . rN. For instance, the means for determining forgetting factor depending on distance FF stores a table having indexes 1 through N in a memory means (not shown). A forgetting factor aN corresponding to distance rq is stored in index q in the table in advance, and the forgetting factor αq corresponding to distance rq is read out of the memory means so as to output to the means for estimating correlation matrix with exponential smoothing q corresponding to distance rq.

The means for estimating correlation matrix with exponential smoothing q (distance rq: q=1, 2, . . . N) estimates a correlation matrix Rxxq which represents a correlation characteristics of the signals between array components (coherence) from output signals XR1(rq), XR2(rq), . . . XRK(rq) of the means for extracting distance component 1 through K, where the output signals are signals relating to the distance rq which are obtained by respective array components with an exponential smoothing method. This estimation is calculated by Expression (10).

[Expression 10]

$$R_{xxq}(m)=\alpha_q \cdot R_{xxq}(m-1)+(1-\alpha_q) \cdot R_{tmp\_xxq}(m) \qquad (10)$$

where Rxxq(m) denotes a correlation matrix estimated value after the m-th snapshot, Rxxq(m−1) denotes a correlation matrix estimated value after the (m−1)th snapshot, Rtmp_xxq(m) denotes a correlation matrix observation value in the m-th snapshot, and aq denotes the forgetting factor α for distance rq.

According to the invention, the forgetting factor α can be independently set, depending on distances. If a target at the distance rq is known to be moving fast transient responsibility in estimation of a correlation matrix can be improved by setting the forgetting factor αq corresponding to the distance rq smaller than the other forgetting factors in order to follow the movement of the target.

Another embodiment of the invention will now be described. The radar signal processor 12 of FIG. 8 has the observation means 1 through K denoted with reference numerals OB, means for respectively extracting distance components 1 through K denoted with reference numerals DS, means for estimating correlation matrix with exponential smoothing 1 through N denoted with reference numerals RM, means for estimating presence and movement state of target denoted with a reference numeral OM, and means for determining forgetting factor depending on distance attenuation denoted with a reference numeral FF1.

Explanations of the observation means p (array components p=1, 2, . . . K), the means for extracting distance component p (array components p=1, 2, . . . K), the means for estimating correlation matrix with exponential smoothing q (distance rq:q=1, . . . N), and the means for estimating presence and movement state of target are omitted since these means are similar to ones of the embodiment of FIG. 1.

The means for determining forgetting factor depending on distance attenuation FF1 independently determines forgetting factors α1, . . . , αN corresponding to distances r1, . . . rN so as to match distance attenuation of reflective waves. For instance, the means for determining forgetting factor depending on distance attenuation FF1 stores a table having indexes 1 through N in memory means (not shown). The forgetting factor αN corresponding to distance rq is stored in index q in the table in advance, and the forgetting factor αq corresponding to distance rq is properly read out of the table in the memory means so as to output to the means for estimating correlation matrix with exponential smoothing q.

One of methods of determining forgetting factors_α1 through αN, matching distance attenuation of reflected waves is shown below.

Received power of a reflected wave in a radar is modeled as shown in Expression (11) by a radar equation.

[Expression 11]

$$P_S = \frac{P_t G^2 \lambda^2 \sigma}{(4\pi)^3} \cdot \frac{1}{r^4} \quad (11)$$

where Ps denotes received power, Pt denotes sending power, G denotes antenna gain, λ denotes wave length of transmitted wave, σ denotes effective reflected area, and r denotes relative distance with a target. As seen from Expression (11), received power depends on distance, and monotonically attenuates. This is distance attenuation of received power.

At this time, input S/N to an antenna is modeled as shown by Expression (12).

Figure 9:
FIG. 9 is a view showing an example of a target distance-input S/N graph.

[Expression 12]

$$\text{input } S/N \triangleq \frac{P_S}{P_N} = \frac{P_t G^2 \lambda^2 \sigma}{P_N (4\pi)^3} \cdot \frac{1}{r^4} \quad (12)$$

where PN denotes noise power due to thermal noise. Since thermal noise is constant irrespective of distance to a target, input S/N (input S/N ratio) to an antenna also depends on distance, and monotonically attenuates. This is referred to as distance attenuation of input S/N. A target distance-input S/N graph of FIG. 9 which represents the influence on input S/N of distance attenuation is obtained with Expression (12). Although the above-mentioned embodiment refers to a case where the target distance-input S/N graph is obtained on the basis of the model of Expression (11), the method may alternatively take into consideration ground reflected waves or may utilize actual measurements.

Whether or not the estimated value of a correlation matrix is proper is determined by an estimated azimuth error which is an error between an estimated azimuth of a target obtained by computing an angular spectrum with the estimated value of the correlation matrix and the actual azimuth of the target. The influence of noise is stochastic, so that an azimuth RMSE (Root Mean Square Error) which is a two squares average of the estimated azimuth error is used as a standard for judging pertinence of the estimated value of the correlation matrix in this case.

Figure 10:
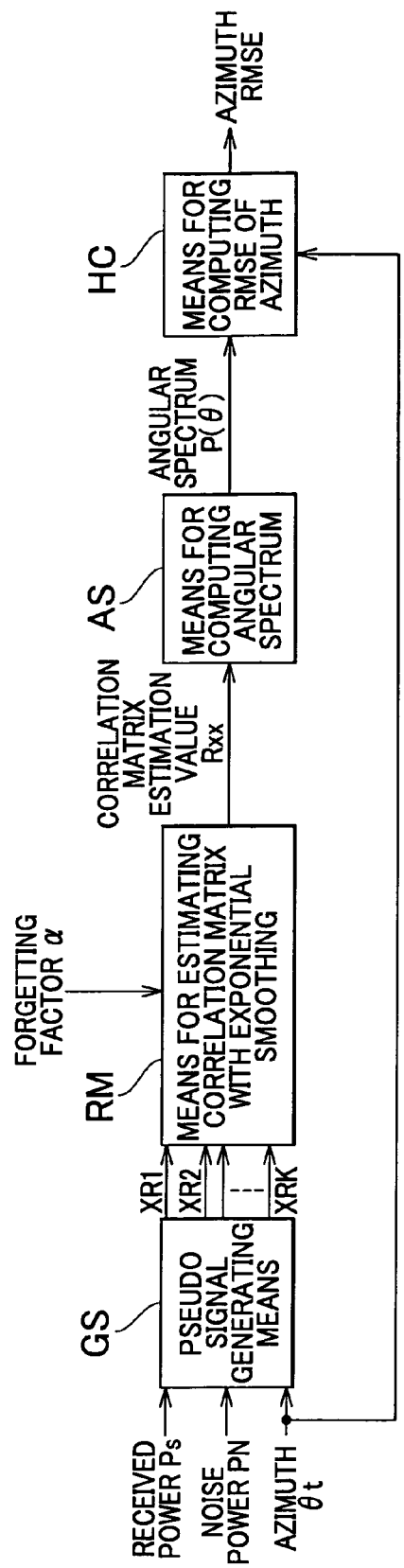
FIG. 10 is a view showing routines for computing a forgetting factor α-azimuth RMSE graph.
Figure 11:
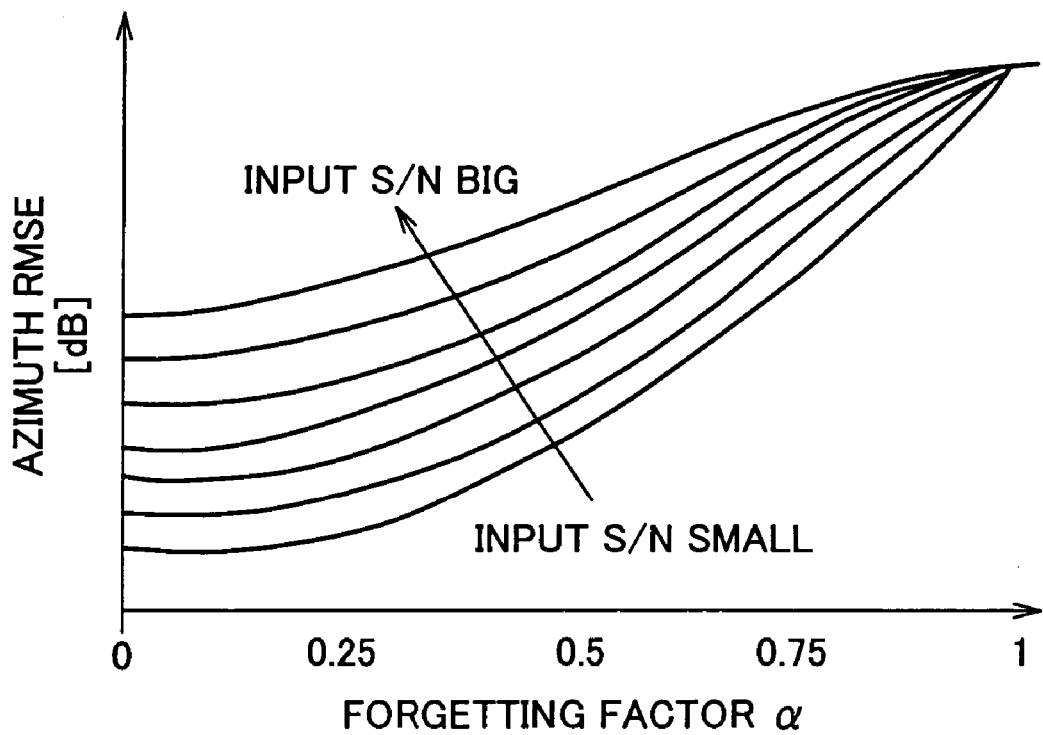
FIG. 11 is a view showing an example of a forgetting factor α-azimuth RMSE graph.

The azimuth RMSE is obtained by a process as shown in FIG. 10. The process of FIG. 10 is simply explained. A pseudo signal generating means GS generates pseudo signals XR1 through XRK, types of which are the same as the output signals of the means for extracting distance component DS, the output signals wherein a spectrum strength Ps of the angular spectrum P(θ) in angle θt is Ps, and the spectrum strength is PN in the other angles, with the received power Ps, noise power PN and target azimuth θt as parameters. The means for estimating correlation matrix with exponential smoothing RM estimates and outputs the correlation matrix estimated value Rxx with the forgetting factor α which is the parameter obtained by inputting the pseudo signals XR1 through XRK by the exponential smoothing method. The angular spectrum computing means AS obtains and outputs the angular spectrum P(θ) with the correlation matrix estimated value Rxx using the method of computing angular spectrum, an example of which is MUSIC. A means for computing RMSE of azimuth HC probes a peak of the angular spectrum P(θ), and obtains an estimated azimuth θte of the target, and calculates |θte−θt| which is an error of the azimuth with the target. Such calculation of the error of the azimuth is repeated twice or more so as to obtain the average of the azimuth errors and output as the RMSE of the azimuth. If the process of FIG. 10 is used, the RMSE of the azimuth can be obtained when the forgetting factor α and the input SN (=Ps/PN) are two variables. FIG. 11 is a typical view showing a graph of forgetting factor α-azimuth RMSE.

The forgetting factor α corresponding to the distance rq is determined, matching the distance attenuation of the reflected wave with the graph of target distance—input S/N and the graph of forgetting factor α-azimuth RMSE as follows.

A desired value of the azimuth RMSE which is a barometer of proper estimated value of the correlation matrix (desired azimuth RMSE) is set.

The input S/N=(S/N)q corresponding to the target distance rq is obtained with the graph of target distance—input S/N (see left FIG. 12).

A curve which corresponds to the input S/N=(S/N)q is selected with the graph of forgetting factor α-azimuth RMSE, and the forgetting factor α corresponding to the desired azimuth RMSE is determined as αq (see right FIG. 12).

The above-mentioned method of determining the forgetting factor is performed for all distances r1, . . . , rN so as to determine the forgetting factors α1, . . . , αN corresponding to the distance attenuation.

The above-identified method is one technique for determining the forgetting factors α1 through αN, matching the distance attenuation of the reflected waves. If the correlation matrix estimated values Rxx1 through Rxxq, which are estimated with these forgetting factors α1 through αN, are used, the means for estimating presence and movement state of target OM can compensate a constant azimuth RMSE in spite of the distance, controlling the influence of the distance attenuation.

Figure 13:
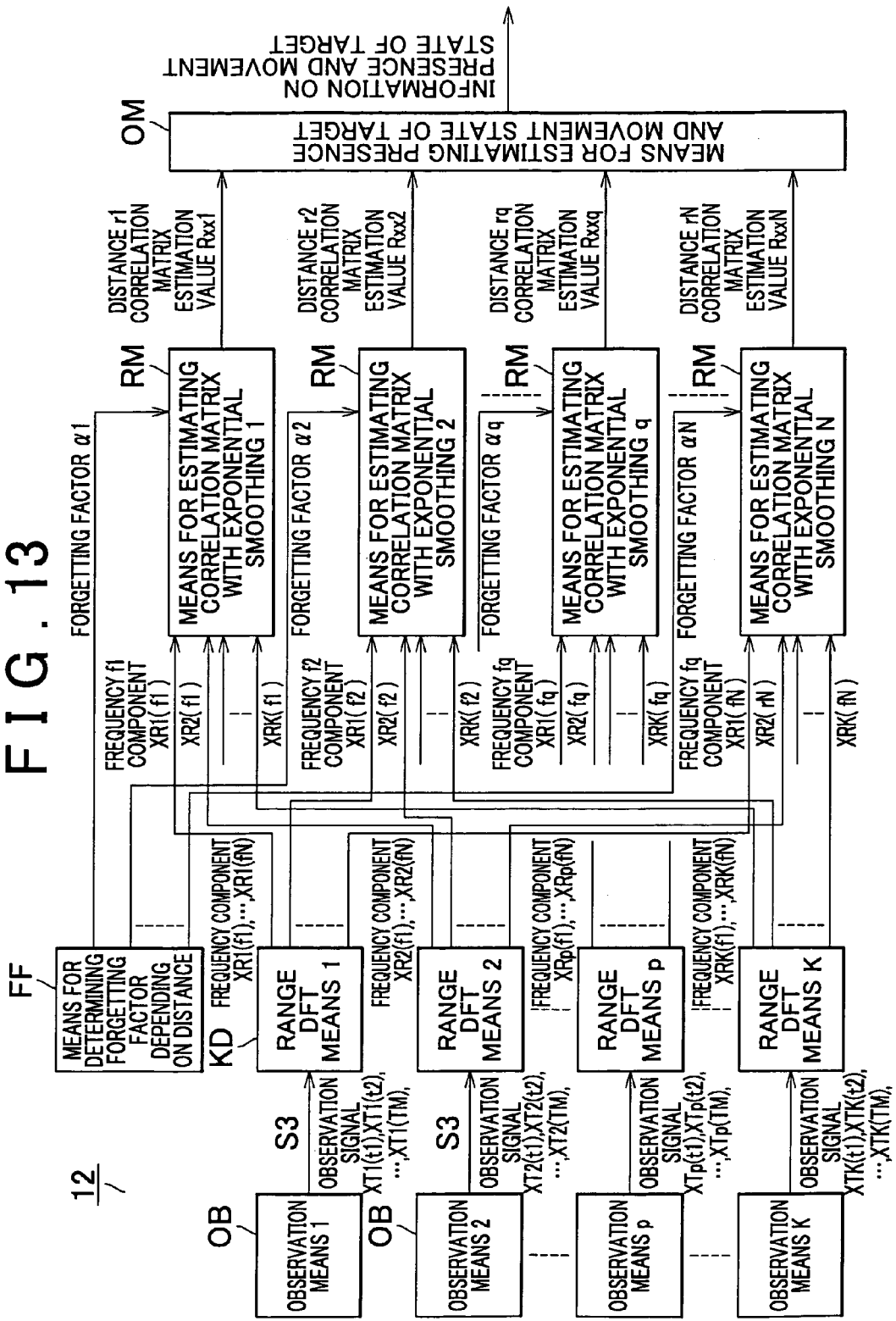
FIG. 13 is a block diagram showing a schematic structure of the vehicle-mounted array radar apparatus of a third embodiment of the invention.

Another embodiment of the invention will now be explained. As shown in FIG. 13, the radar signal processor 12 of this embodiment has observation means 1 through K denoted with reference numerals OB, range DFT (discrete Fourier transform) means 1 through K denoted with reference numerals KD, means for estimating correlation matrix with exponential smoothing 1 through N denoted with reference numerals RM, means for estimating presence and movement state of target denoted with a reference numeral OM, and means for determining forgetting factor depending on distance denoted with a reference numeral FF.

Explanations of the means for estimating correlation matrix with exponential smoothing q (distance rq:q=1, . . . , N), the means for estimating presence and movement state of target OM, and the means for determining forgetting factor depending on distance FF are not provided here since these means are similar to those described in relation to the apparatus of FIG. 1.

In this embodiment, the radar where the frequency component of the observation signal obtained thereby corresponds to the distance component, such as the FM-CW radar, is used as the observation means p (array component p=1, 2, . . . K). When explaining the case of the FM-CW radar, for instance, the observation signals XTp(t1), XTp(t2), XTp(t3), . . . XTp(tM) include the frequency component of fB [Hz] as shown in Expression (13) if the relative velocity of the target is neglected.

[Expression 13]

$$f_B = \frac{4 \cdot \Delta F}{V_C \cdot T_m} \cdot r [\text{Hz}] \qquad (13)$$

where r denotes the distance to the target, V denotes the relative velocity of the target, Vc denotes light speed, ΔF denotes the frequency deviation width of frequency modulation, Tm denotes the cycle period of frequency modulation, and Fo denotes central transmitting frequency.

The range DFT (discrete Fourier transform) means p (array component P=1, 2, . . . K) computes and outputs frequency components XRp(f1), . . . , XRp(fN) corresponding to the frequencies fi, . . . fN by Discrete Fourier Transform from the observation signals S3. For instance, the frequency fq component XRp(fq) is calculated by Expression (14).

[Expression 14]

$$XR_p(f_q) = \sum_{n=1}^{N} XT(t_i) e^{-j\frac{2\pi nq}{N}} \qquad (14)$$

But, the frequency fq is defined by Expression (15)

[Expression 15]

$$f_q \overset{\Delta}{=} \frac{q}{N} \cdot \frac{1}{T_s} \qquad (15)$$

if a sampling cycle of the observation signal is Ts. Since the frequency fq corresponds to the distance of Expression (16),

[Expression 16]

$$r_q = \frac{V_C \cdot T_m}{4 \cdot \Delta F} \cdot f_q \qquad (16)$$

the frequency fq component XRp(fq) becomes the distance component in the distance rq which is defined by Expression (16).

The distance component of the distance rq which is defined by Expression (16) by the range DFT means q is outputted as the frequency component XRp(fq), so that subsequent process can be executed similarly to the embodiment of FIG. 1 and effects similar to the embodiment of FIG. 1 can be obtained.

Besides, a Fast Fourier Transform can be used when computing in accordance with Expression (14) to enhance computing speed.

Figure 14:
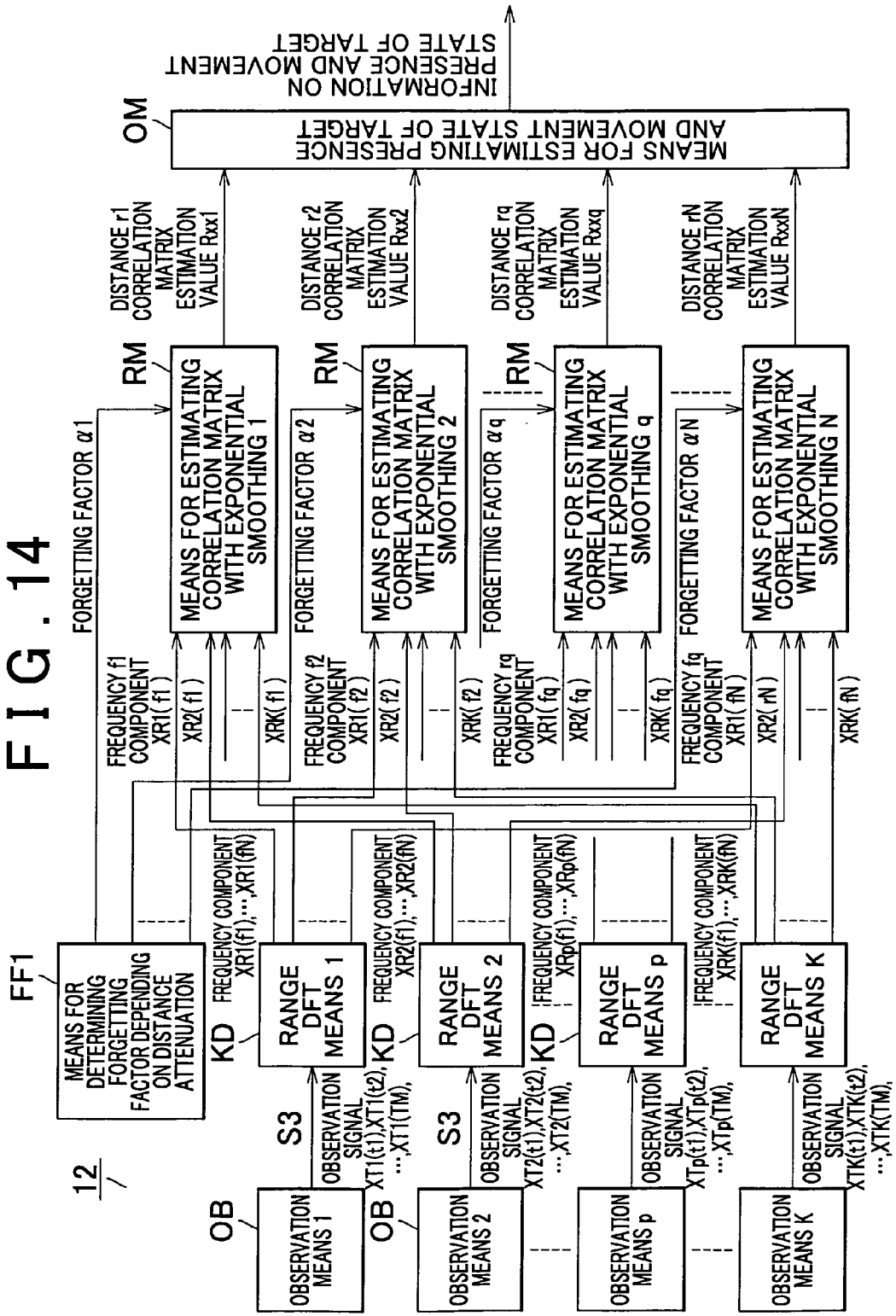
FIG. 14 is a block diagram showing a schematic structure of the vehicle-mounted array radar apparatus of a fourth embodiment of the invention.

Another embodiment of the invention will now be explained, referring to FIG. 14. The radar signal processor 12 of FIG. 14 has observation means 1 through K denoted with reference numerals OB, range DFT means 1 through K denoted with reference numerals KD, means for estimating correlation matrix with exponential smoothing 1 through N denoted with reference numerals RM, means for estimating presence and movement state of target denoted with a reference numeral OM, and means for determining forgetting factor depending on distance attenuation denoted with a reference numeral FF1.

Figure 8:
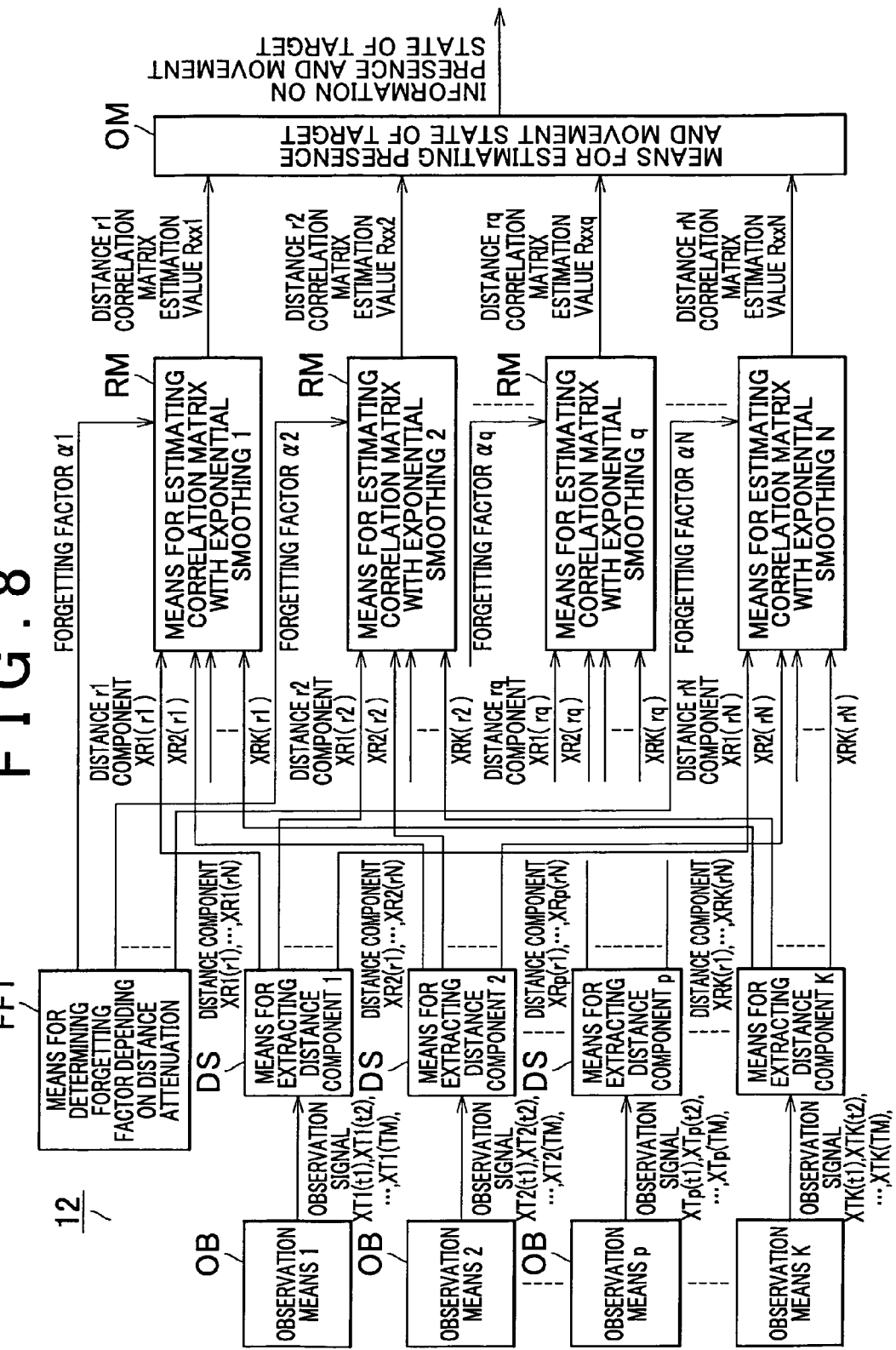
FIG. 8 is a block diagram showing a schematic structure of the vehicle-mounted array radar apparatus of a second embodiment of the invention.

Explanations of the means for estimating correlation matrix with exponential smoothing q (distance rq:q=1, . . . , N), and the means for estimating presence and movement state of target, and the means for determining forgetting factor depending on distance attenuation are not provided here since these means are similar to those described in relation to the invention of FIG. 8.

In addition, explanations of the observation means p (array components P=1, 2, . . . , K), and the range DFT means p (array components P=1, 2, . . . , K) are omitted since these means are similar to those described in relation to the embodiment of FIG. 13.

According to this invention, in the array radar apparatus having the radar where the frequency component of the observation signal S3 obtained by the observation means OB corresponds to the distance component, such as the FM-CW radar, as the observation means, the means for estimating presence and movement state of target OM can compensate a constant azimuth RMSE in spite of the distance, controlling the influence of the distance attenuation.

Figure 15:
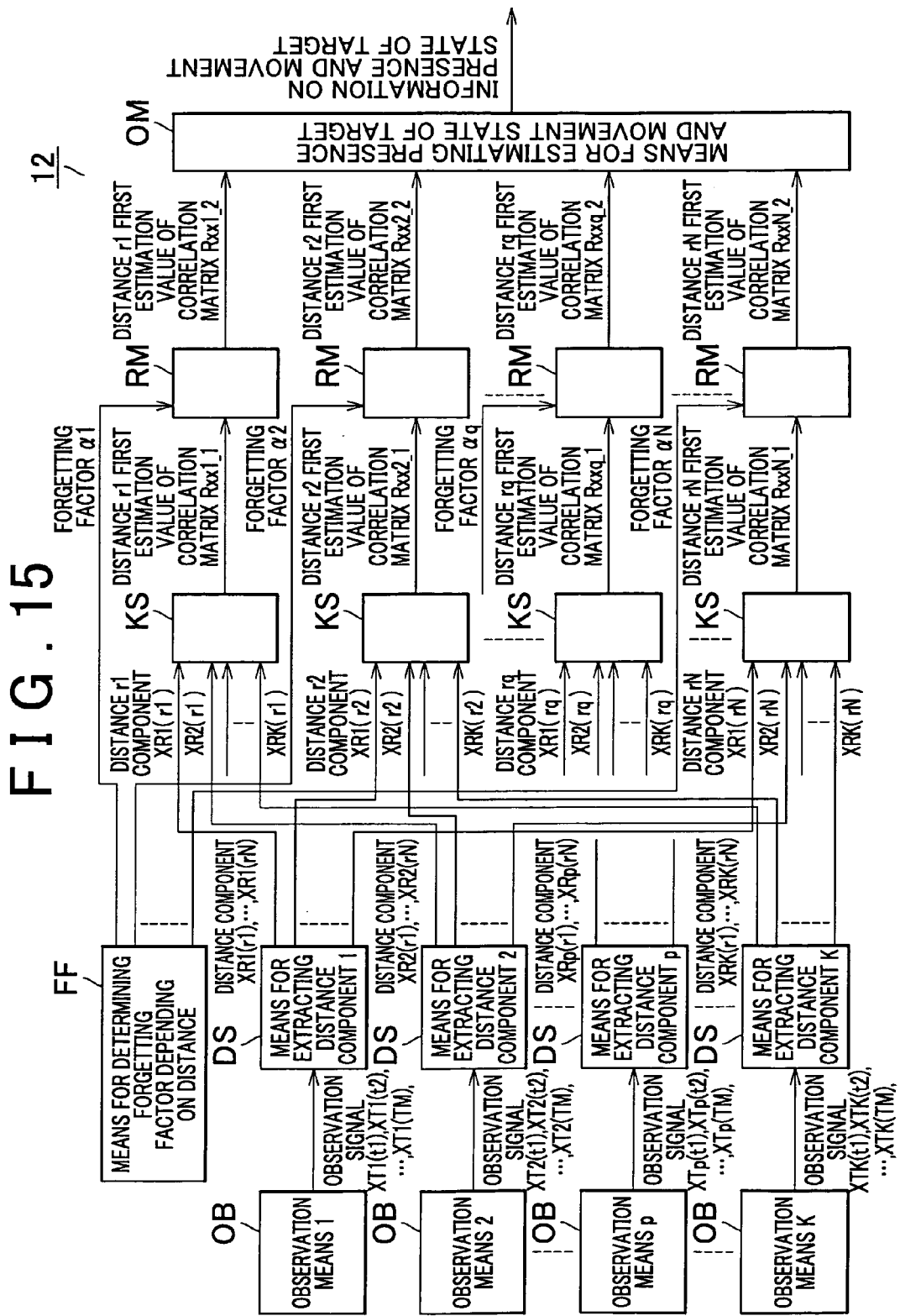
FIG. 15 is a block diagram showing a schematic structure of the vehicle-mounted array radar apparatus of a fifth embodiment of the invention.

Another embodiment of the invention will now be described in relation to FIG. 15. The radar signal processor 12 of FIG. 15 has observation means 1 through K denoted with reference numerals OB, means for respectively extracting distance components 1 through K denoted with reference numerals DS, means for estimating correlation matrix with section average 1 through N denoted with reference numerals KS, means for estimating correlation matrix with exponential smoothing 1 through N denoted with reference numerals RM, means for estimating presence and movement state of target denoted with a reference numeral OM, and means for determining forgetting factor depending on distance denoted with a reference numeral FF.

Explanations of the observation means p (array components P=1, 2, . . . K), the means for extracting distance component p (array components P=1, 2, . . . , K), the means for estimating presence and movement state of target OM, the means for determining forgetting factor depending on distance FF are not provided here since these means are similar to those described in relation to the embodiment of FIG. 1.

The means for estimating correlation matrix with section average q (distance rq, q=1, 2, . . . , N) calculates the correlation matrix observation value Rtmp_xxq(m) of Expression (5) from the distance rq components XR1(rq), . . . , XRK(rq), and computes an estimation of the correlation matrix with section average by Expression (6) or (7). The computed estimate is outputted as the first correlation matrix estimated value Rxxq_1(m).

The means for estimating correlation matrix with exponential smoothing q (distance rq: q=1, 2, . . . , N) uses the first correlation matrix estimated value Rxxq_1(m) in place of the observation value of the correlation matrix, and estimates the second correlation matrix estimated value Rxxq_2(m) by the exponential smoothing method and outputs this. Such estimation is executed by Expression (17).

[Expression 17]

$$R_{xxq\_2}(m) = \alpha_q \cdot R_{xxq\_2}(m-1) + (1-\alpha_q) \cdot R_{xxq\_1}(m) \qquad (17)$$

For the arrangement in which the array radar apparatus for estimating the correlation matrix with the means for estimating correlation matrix with section average KS and the means for estimating correlation matrix with exponential smoothing RM are arranged in series, the forgetting factors α can be independently set according to the distance.

Another embodiment of the invention will now be described in relation to FIG. 16. The radar signal processor 12 of FIG. 16 has observation means 1 through K denoted with reference numerals OB, means for respectively extracting distance components 1 through K denoted with reference numerals DS, means for estimating correlation matrix with exponential smoothing 1 through N denoted with reference numerals RM, means for estimating presence and movement state of target denoted with a reference numeral OM, a "ones own vehicle" sensor denoted with a reference numeral SN, and means for determining forgetting factor denoted with a reference numeral FX.

Explanations of the observation means p (array components P=1, 2, ... K), and the means for extracting distance component p (array components P=1, 2, ... K), means for estimating correlation matrix with exponential smoothing q (distance rq; q=1, 2, ... N), the means for estimating presence and movement state of target OM are not provided here since these means are similar to those described in relation to the embodiment of FIG. 1.

The ones own vehicle sensor SN senses a movement state of ones own vehicle, and outputs information obtained thereby as ones own vehicle movement state information AI. The ones own vehicle movement state information AI includes a velocity of ones own vehicle Vm, an acceleration of ones own vehicle am, a turn angle velocity γ, a turning radius ρ, and the like. For instance, the ones own vehicle sensor SN obtains the above-mentioned ones own vehicle movement state information AI using positioning information obtained by a sensor for obtaining positioning information, such as a GPS.

The means for determining forgetting factor FX determines the forgetting factors α to be used by the means for estimating correlation matrix with exponential smoothing 1 through N on the basis of the ones own vehicle movement state information AI. For instance, the forgetting factor α is determined in such a way that a table having acceleration of ones own vehicle as an index is stored in a memory (not shown), and the corresponding forgetting factor α is read out of the memory according to the acceleration of ones own vehicle which is obtained as ones own vehicle movement state information AI, by referring to the table.

The optional forgetting factor α can be thus set according to the movement state of ones own vehicle.

Another embodiment of the invention will now be described in relation to FIG. 17. The radar signal processor 12 of FIG. 17 has observation means 1 through K denoted with reference numerals OB, means for respectively extracting distance components 1 through K denoted with reference numerals DS, means for respectively estimating correlation matrices with exponential smoothing 1 through N denoted with reference numerals RM, means for estimating presence and movement state of target denoted with reference numeral OM, the ones own vehicle sensor denoted with reference numeral SN, and means for determining forgetting factor denoted with the reference numeral FX.

Explanations of the observation means p (array components P=1, 2, ... K), and the means for extracting distance component p (array components P=1, 2, ... K), means for estimating correlation matrix with exponential smoothing q (distance rq: q=1, ... N), the means for estimating presence and movement state of target OM are not provided here since these means are similar to those described in relation to the embodiment of FIG. 1.

Ones own vehicle sensor SN senses a turning state of ones own vehicle, and outputs information obtained thereby as ones own vehicle turning state information AI1. The ones own vehicle turning state information AI1 includes the turn angle velocity γ, turning radius ρ, and the like. A sensor similar to one of the embodiment of FIG. 16 is used as the ones own vehicle sensor SN.

The means for determining forgetting factor FX determines the forgetting factors α to be given to the means for estimating correlation matrix with exponential smoothing 1 through N on the basis of the ones own vehicle turning state information AI1. For instance, the forgetting factor α is determined in such a way that a table having the turn angle velocity γ as an index is stored in memory means (not shown), and the corresponding forgetting factor α is read out of the memory according to the turn angle velocity γ which is obtained as the ones own vehicle movement state information AI, referring to the table.

The optional forgetting factor α can thus be set according to the turning state of ones own vehicle.

Figure 17:
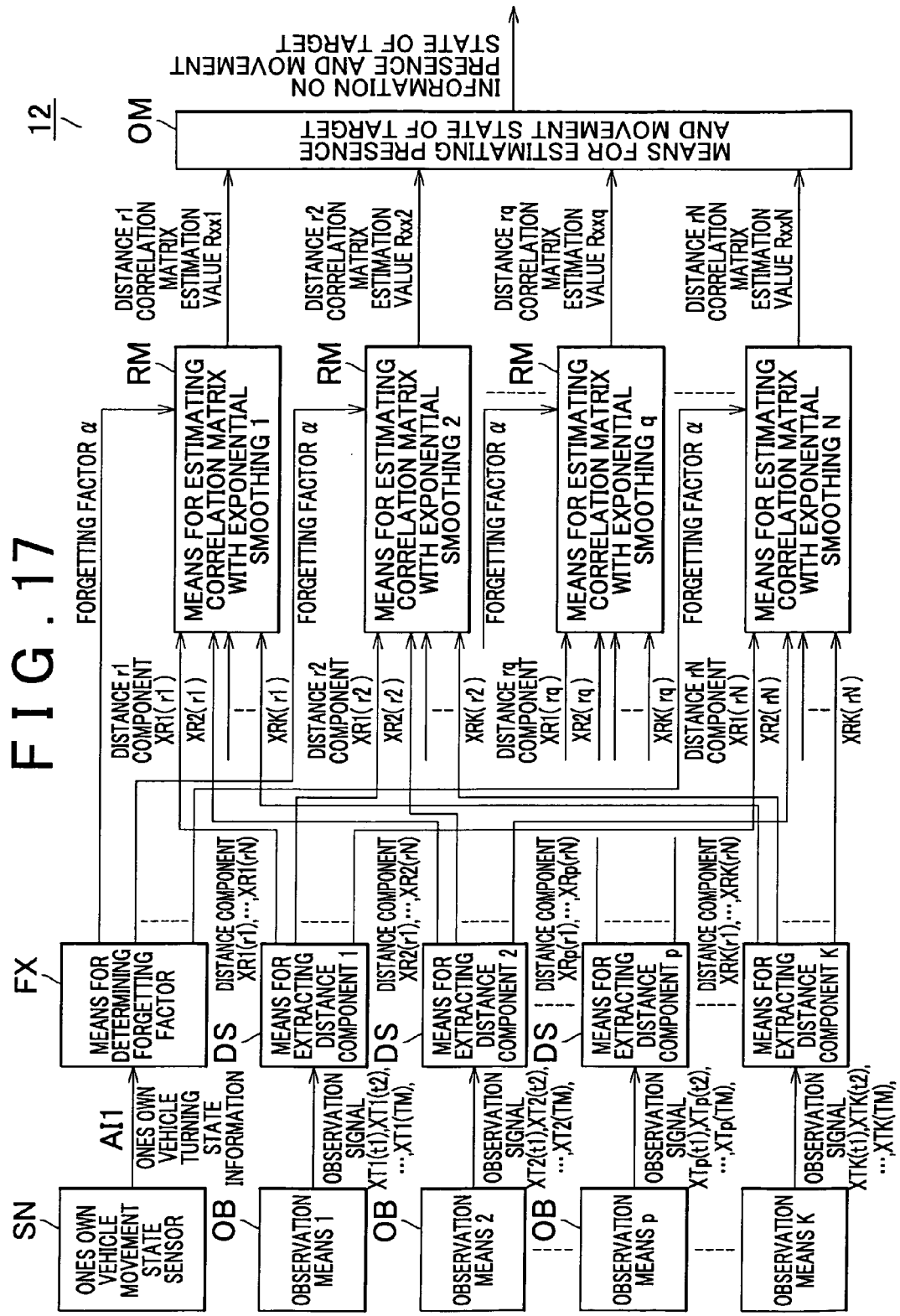
FIG. 17 is a block diagram showing a schematic structure of the vehicle-mounted array radar apparatus of a seventh embodiment of the invention.

Further, in FIG. 17, the means for determining forgetting factor FX may determine whether ones own vehicle turns or not on the basis of the ones own vehicle turning state information AI1, and determines the forgetting factors α to be provided to the means for estimating correlation matrix with exponential smoothing 1 through N according to the result of the determination. Whether ones own vehicle turns or not is determined by the turn angle velocity γ, for instance. Non-turning (including straight movement) is determined if the turn angle velocity γ is smaller than a predetermined threshold value γ0, and turning is determined if the turn angle velocity γ is a predetermined threshold value γ0 or more. On the basis of such a judgment, turning or non-turning, the forgetting factor α is selected and outputted in such a way that the small forgetting factor α is read out of the memory means at the time of turning, and the big forgetting factor α is read out of the memory means at the time of non-turning.

It is thus possible to obtain high transient response performance of the correlation matrix estimation which is required for a change of the target signal at the time of turning as well as high S/N improvement which is required at the time of non-turning.

Figure 18:
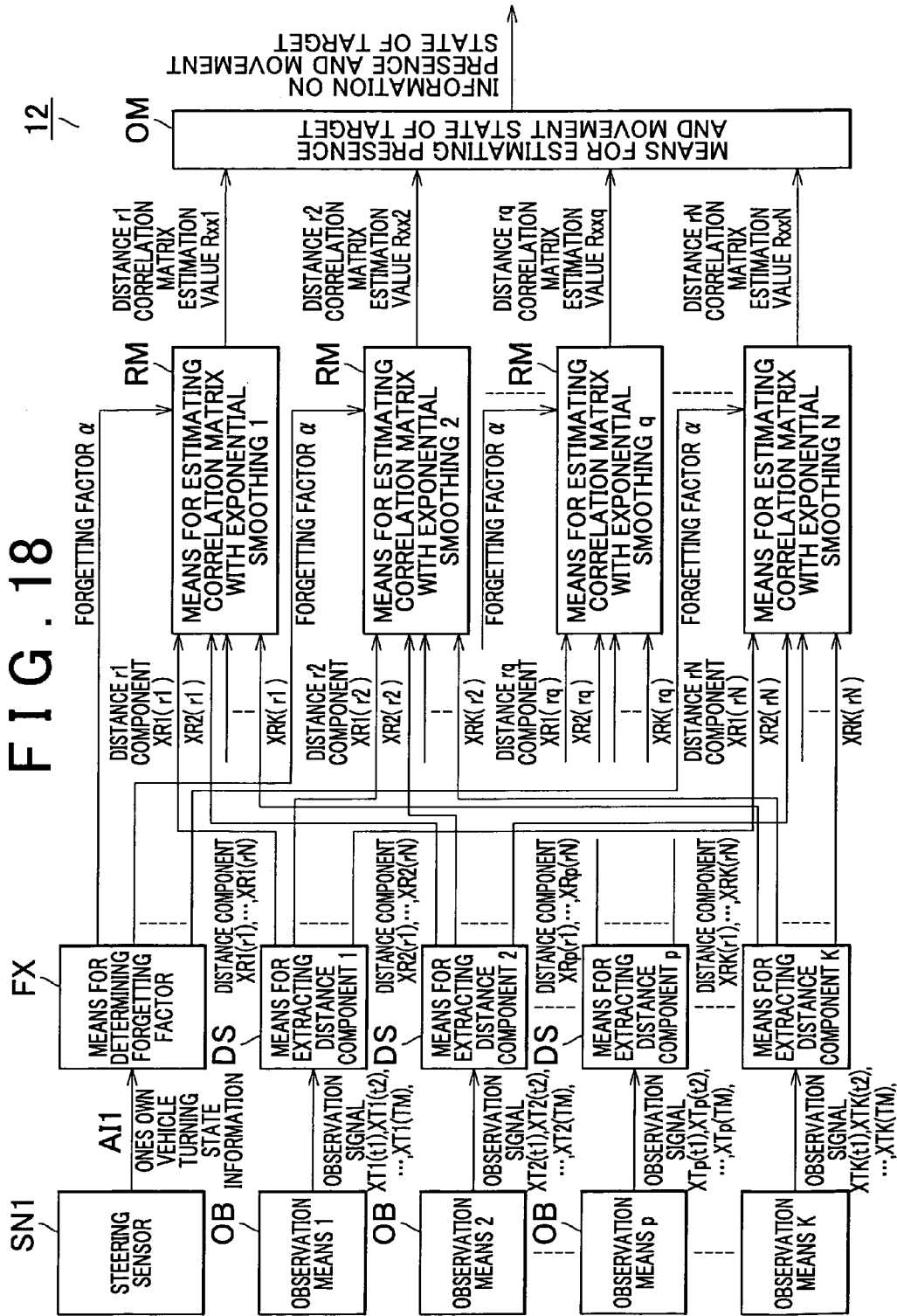
FIG. 18 is a block diagram showing a schematic structure of the vehicle-mounted array radar apparatus of a ninth embodiment of the invention.

Another embodiment of the invention will now be described in relation to FIG. 18. The radar signal processor 12 of FIG. 18 has a steering sensor SN1 in place of the ones own vehicle sensor SN of the embodiment of FIG. 17. As such, explanations of the structural elements of this embodiment, excluding the steering sensor SN1, will not be described in detail.

The steering sensor SN1 observes an actual steering angle δ of ones own vehicle. The following relation as shown by Expression (18) is thus obtained between the actual steering angle δ and the turn angle velocity γ.

[Expression 18]

$$\gamma = \frac{V_m}{l} \cdot \delta \quad (18)$$

where Vm denotes a velocity of ones own vehicle, and l denotes a wheel base. The turn angle velocity γ is proportional to the actual steering angle δ provided that Vm is constant. Then, the steering sensor outputs the actual steering angle δ as the ones own vehicle turning state information AI1 in place of the turn angle velocity γ.

The means for determining forgetting factor FX determines the forgetting factors α to be provided to the means for estimating correlation matrix with exponential smoothing 1 through N on the basis of the actual steering angle δ outputted as the ones own vehicle turning state information AI1.

Effects similar to those of the embodiment of FIG. 17 can be thus obtained with the steering sensor which is easily installed.

Figure 19:
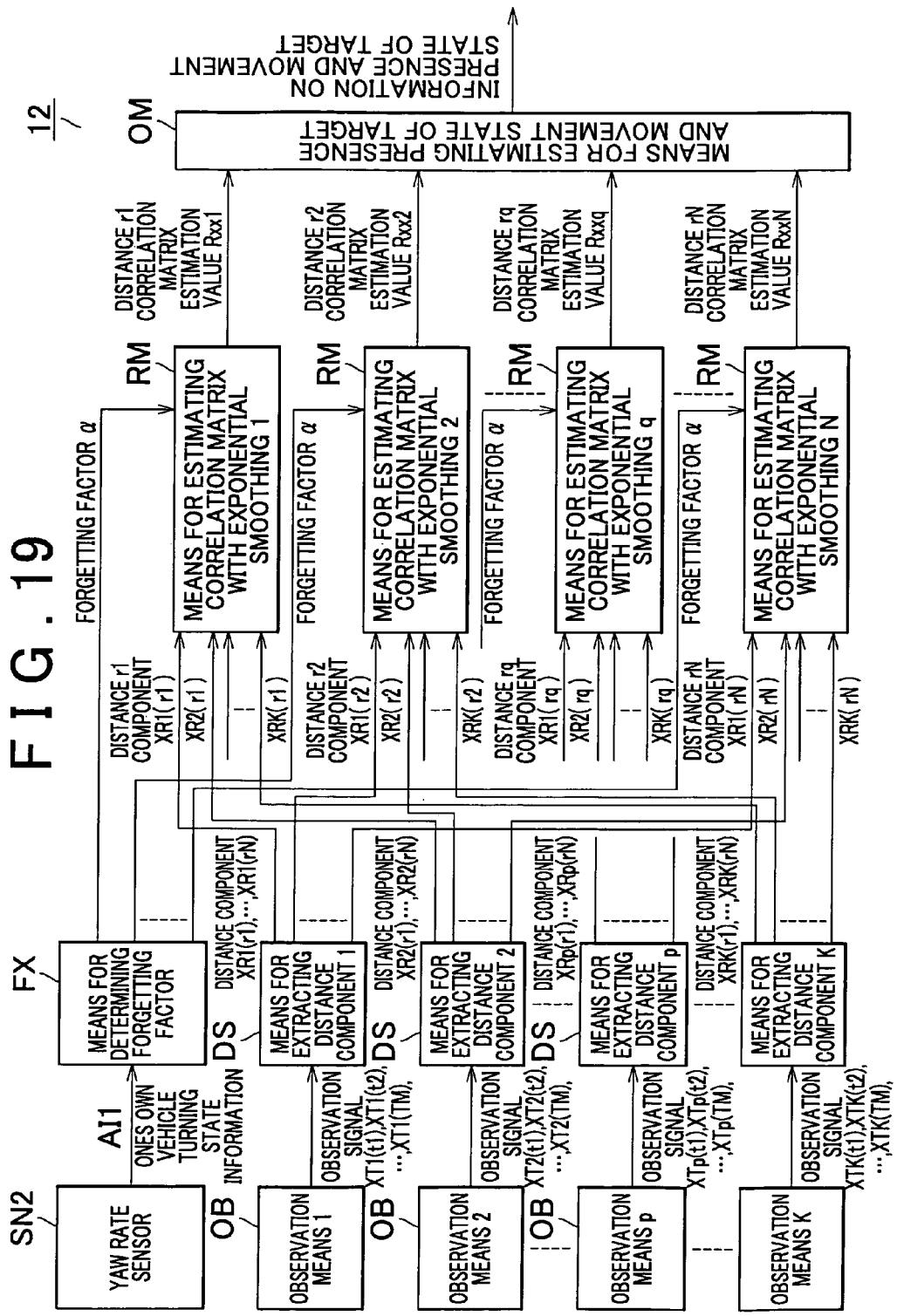
FIG. 19 is a block diagram showing a schematic structure of the vehicle-mounted array radar apparatus of a tenth embodiment of the invention.

A further embodiment of the invention will now be described in relation to FIG. 19. The radar signal processor 12 of FIG. 19 has a Yaw Rate sensor SN2 in place of the ones own vehicle sensor SN of FIG. 17, as such elements other than the Yaw Rate sensor SN2 will not be described in detail.

The Yaw Rate sensor SN2 directly determines the turn angle velocity γ using a gyro mechanism, and outputs the turn angle velocity γ as the ones own vehicle turning state information AI1.

The means for determining forgetting factor FX determines the forgetting factors α to be provided to the means for estimating correlation matrix with exponential smoothing 1 through N on the basis of the turn angle velocity γ outputted as the ones own vehicle turning state information AI1.

Effects similar to ones in the invention of FIG. 17 can be thus obtained with the Yaw Rate sensor which is easily installed.

Figure 20:
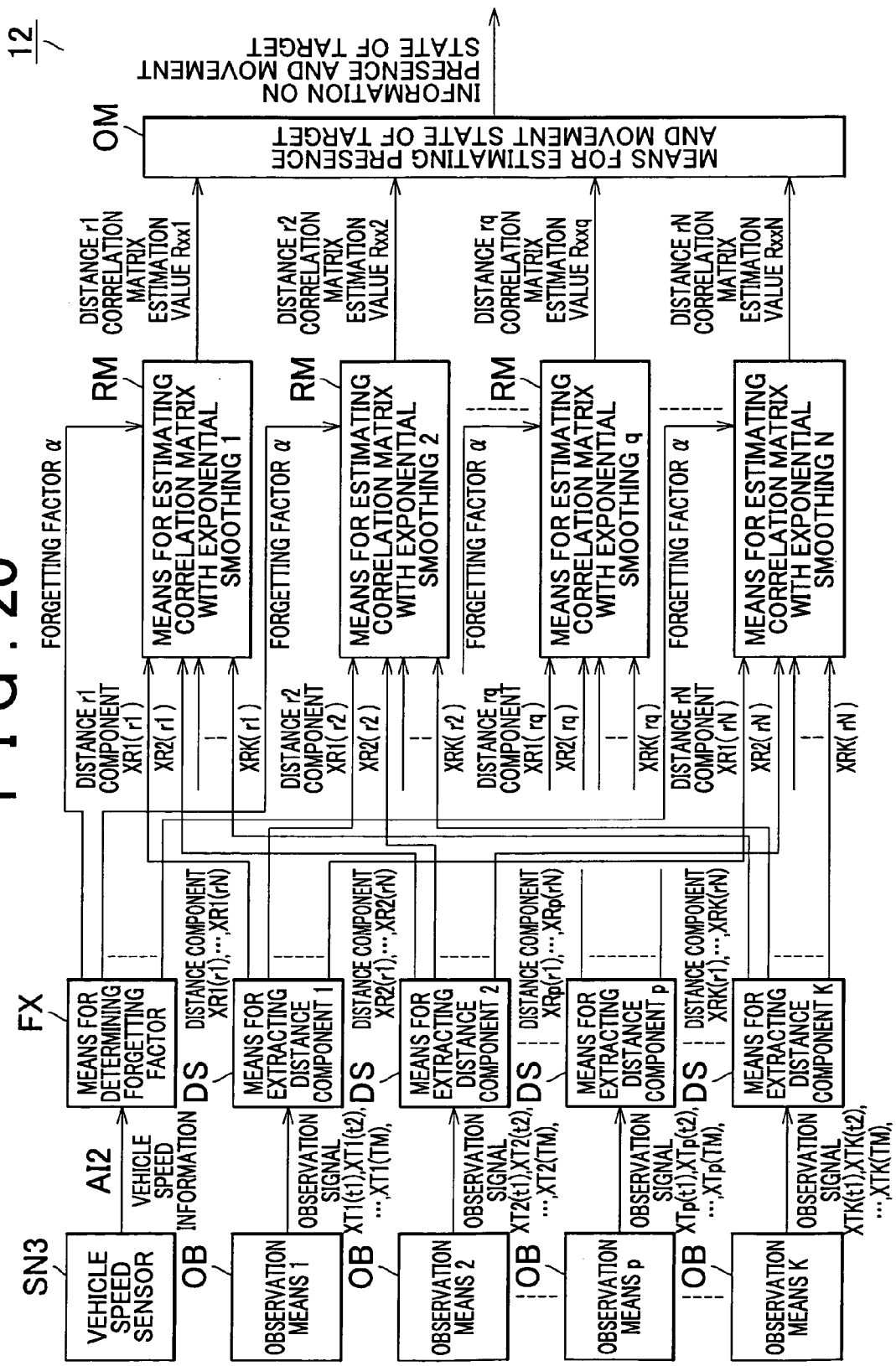
FIG. 20 is a block diagram showing a schematic structure of the vehicle-mounted array radar apparatus of an eleventh embodiment of the invention.

A further embodiment of the invention will now be described in relation to FIG. 20. The radar signal processor 12 of FIG. 20 has the observation means 1 through K denoted with reference numerals OB, means for respectively extracting distance components 1 through K denoted with reference numerals DS, means for respectively estimating correlation matrices with exponential smoothing 1 through N denoted with reference numerals RM, means for estimating presence and movement state of target denoted with the reference numeral OM, a vehicle speed sensor denoted with a reference numeral SN3, and means for determining forgetting factor denoted with the reference numeral FX.

Explanations of the observation means p (array components P=1, 2, . . . K), and the means for extracting distance component p (array components P=1, 2, . . . K), means for estimating correlation matrix with exponential smoothing q (distance rq: q=1, . . . N), the means for estimating presence and movement state of target OM are not provided since these means are similar to those described in relation to the embodiment of FIG. 1.

The vehicle speed sensor SN3 senses a vehicle speed Vm of ones own vehicle, and outputs the sensed as vehicle speed information AI2.

The means for determining forgetting factor FX determines the forgetting factors α to be provided to the means for estimating correlation matrix with exponential smoothing 1 through N on the basis of the vehicle speed information AI2. For instance, the forgetting factor α is determined in such a way that a table having the vehicle speed Vm as an index is stored in memory means, and the forgetting factor α is read out of the memory means according to the vehicle speed Vm which is obtained as the vehicle speed information AI2, referring to the table.

The optional forgetting factor α can be thus set according to the vehicle speed.

The means for determining forgetting factor FX may judge high speed or low speed in such a way that high speed is determined if the vehicle speed of ones own vehicle is higher than a predetermined threshold value V0, and low speed is determined if the vehicle speed is a predetermined threshold value V0 or lower. On the basis of such a determination, high speed or low speed, a small forgetting factor α is selected from the most suitable predetermined ones at the time of high speed, and a big forgetting factor α is selected from the most suitable predetermined ones at the time of low speed, and the selected one is outputted.

It is thus possible to properly obtain high transient response performance of the correlation matrix estimation which is required due to a large difference in relative speed between a target which is stationary or travels at low speed when ones own vehicle travels at high speed and high S/N improvement which is required at the time of low speed.

Figure 21:
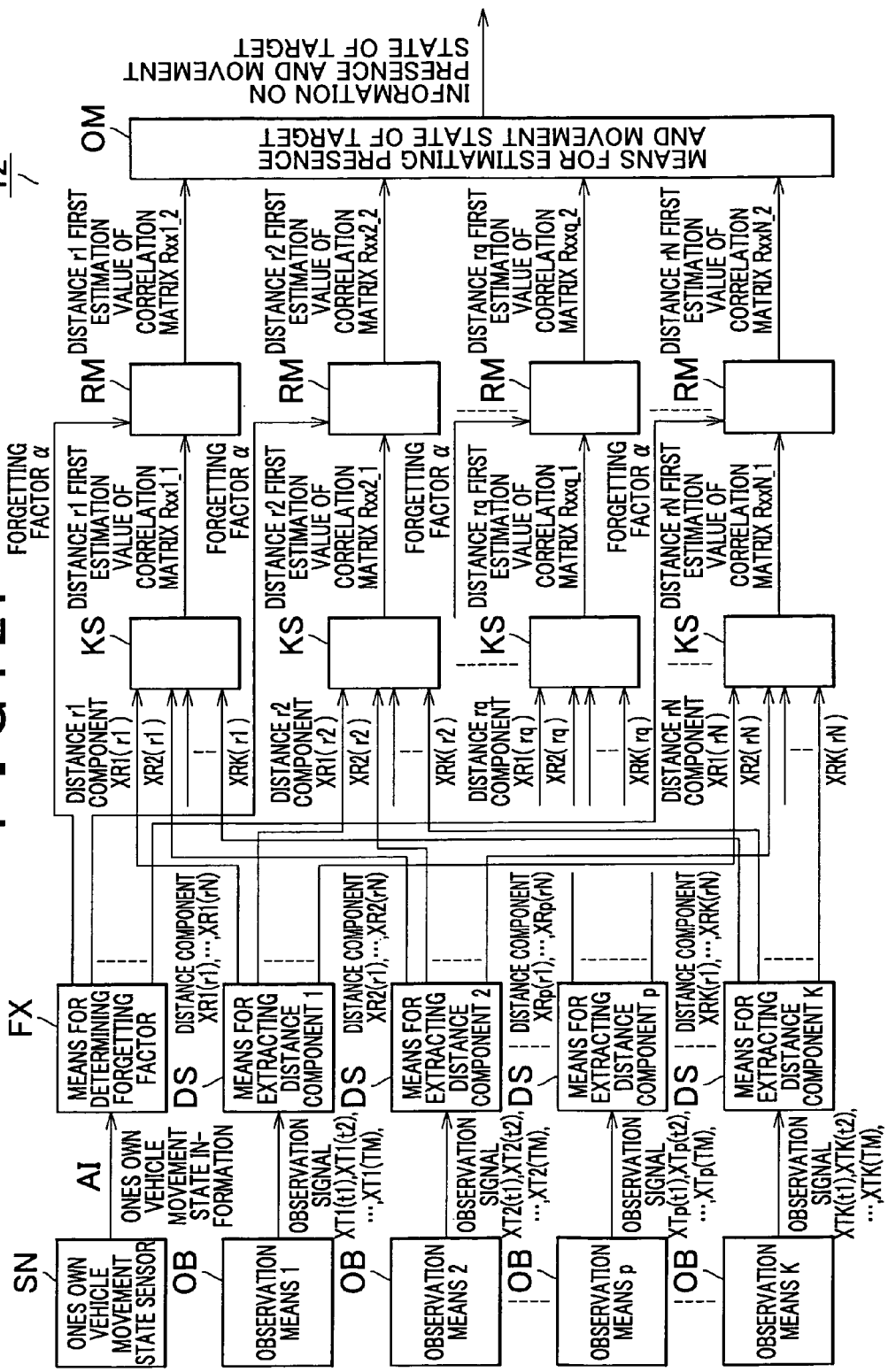
FIG. 21 is a block diagram showing a schematic structure of the vehicle-mounted array radar apparatus of a thirteenth embodiment of the invention.

Another embodiment of the invention will now be described in relation to FIG. 21. The radar signal processor 12 of FIG. 21 has observation means 1 through K denoted with reference numerals OB, means for respectively extracting distance components 1 through K denoted with reference numerals DS, means for estimating correlation matrix with section average 1 through N denoted with reference numerals KS, means for respectively estimating correlation matrices with exponential smoothing 1 through N denoted with reference numerals RM, means for estimating presence and movement state of target denoted with the reference numeral OM, ones own vehicle sensor denoted with the reference numeral SN, and means for determining forgetting factor denoted with the reference numeral FX.

Explanations of the observation means p (array components P=1, 2, . . . K), the means for extracting distance component p (array components P=1, 2, . . . K), the means for estimating correlation matrix with section average q (distance rq: q=1, . . . , N), the means for estimating correlation matrix with exponential smoothing q (distance rq: q=1, . . . , N), and the means for estimating presence and movement state of target OM are not provided because these means are similar to those described in relation to the embodiment of FIG. 15.

Figure 16:
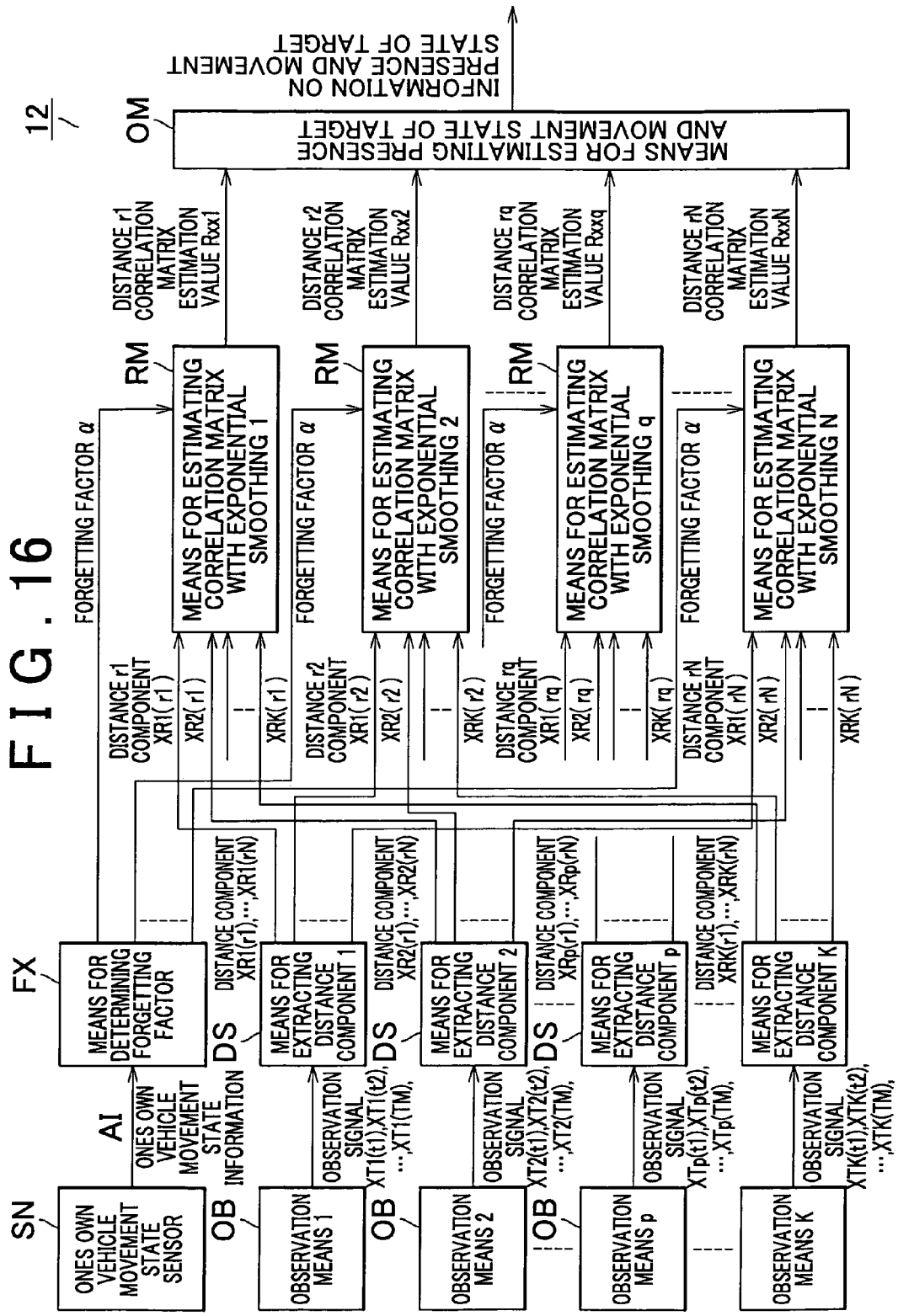
FIG. 16 is a block diagram showing a schematic structure of the vehicle-mounted array radar apparatus of a sixth embodiment of the invention.

In addition, explanations of the ones own vehicle sensor SN and the means for determining forgetting factor FX are likewise not provided because these means are similar to those described in relation to the embodiment of FIG. 16.

In the array radar apparatus for estimating the correlation matrix with the means for estimating correlation matrix with section average KS and the means for estimating correlation matrix with exponential smoothing RM which are provided in series, the forgetting factors α can be thus optionally set according to the movement state of ones own vehicle.

Yet another embodiment of the invention will now be described in relation to FIG. 22. The radar signal processor 12 of FIG. 22 has observation means 1 through K denoted with reference numerals OB, means for respectively extracting distance components 1 through K denoted with reference numerals DS, means for respectively estimating correlation matrices with exponential smoothing 1 through N denoted with reference numerals RM, means for estimating presence and movement state of target denoted with the reference numeral OM, means for obtaining surroundings of ones own vehicle denoted with a reference numeral SN4, and means for determining forgetting factor denoted with the reference numeral FX.

Explanations of the observation means p (array components P=1, 2, . . . K), and the means for extracting distance component p (array components P=1, 2, . . . K), the means for estimating correlation matrix with exponential smoothing q (distance rq: q=1, . . . , N), the means for estimating presence and movement state of target OM are not provided because these means are similar to those described in relation to the embodiment of FIG. 1.

The means for obtaining surroundings of ones own vehicle SN4 obtains the surroundings of ones own vehicle, and outputs the obtained as information on surroundings of ones own vehicle AI3. The "surroundings" are whether a target exists or not, a shape of a road, speed limit, a division of a road, highway or ordinary road, and the like. As a method of obtaining the surroundings of ones own vehicle, a peripheral image is obtained with a CCD sensor, and by picture processing and/or picture recognition on the obtained image, the presence of a target in the surroundings, the shape of a road, a speed limit, and a division of a road are determined.

The means for determining forgetting factor FX determines the forgetting factors $\alpha$ to be provided to the means for estimating correlation matrix with exponential smoothing 1 through N on the basis of the information on surroundings of ones own vehicle AI3. For instance, in the case in which no target is present, the smaller forgetting factor $\alpha$ is selected in order to improve a transient response in preparation for determining the presence of a new target, and in case of the presence of a target, the big forgetting factor $\alpha$ is selected in order to continuously watch the target according to the presence of the target in the surroundings. By doing so, the forgetting factor $\alpha$ can be optionally set according to the surroundings of ones own vehicle.

The forgetting factor $\alpha$ which is determined by the means for determining forgetting factor FX may be changed according to the target which is searched by the radar signal processor 12, such as a pedestrian, a vehicle or a bicycle which suddenly appears from a side road, and a preceding vehicle.

In such a case, the means for determining forgetting factor FX determines the small forgetting factor $\alpha$ in order to improve a transient response for the target, the relative moving speed of which is high compared to ones own vehicle, such as a pedestrian, a bicycle or a vehicle that suddenly rushes in the forward direction, and determines the big forgetting factor $\alpha$ in order to reduce a transient response for the target, the relative moving speed of which is low compared to ones own vehicle, such as a preceding vehicle for which a change of inter-vehicle distance to ones own vehicle is small.

The types of targets to be searched may be set by operating means for setting target to be searched, for inputting types of targets to be searched, such as a switch (not shown), which may be operated by a driver according to a driving state of ones own vehicle. When ones own vehicle is driven in an urban area, for instance, a driver operates the means for setting target to be searched in a back street so as to set a pedestrian as the target to be searched by the radar signal processor 12, and the means for setting target to be searched outputs a search signal, such as a pedestrian, to the means for determining forgetting factor FX, and the means for determining forgetting factor FX sets the small forgetting factor $\alpha$, the transient response of which is high in preparation for a pedestrian, a bicycle or a vehicle that suddenly rushes in the forwarding direction.

If no big change in the state of a preceding vehicle is expected when ones own vehicle runs in a suburban area or on a highway, a driver sets the preceding vehicle as the target to be searched by the radar signal processor 12 with the operation of the means for setting target to be searched. Then, the means for setting target to be searched outputs a preceding vehicle searching signal to the means for determining forgetting factor FX, and the means for determining forgetting factor FX sets the big forgetting factor $\alpha$ for actualizing high S/N improvement in preparation for the search for the preceding vehicle. The forgetting factor can be thus properly changed according to the types of targets to be searched, such as a pedestrian or a preceding vehicle in the forwarding direction.

A further embodiment of the invention will now be described in relation to FIG. 23. The radar signal processor 12 of FIG. 23 has the observation means 1 through K denoted with reference numerals OB, means for respectively extracting distance components 1 through K denoted with reference numerals DS, means for respectively estimating correlation matrices with exponential smoothing 1 through N denoted with reference numerals RM, means for estimating presence and movement state of target denoted with the reference numeral OM, means for obtaining surroundings of ones own vehicle denoted with the reference numeral SN4, and means for determining forgetting factor denoted with the reference numeral FX.

Explanations of the observation means p (array components P=1, 2, ... K), and the means for extracting distance component p (array components P=1, 2, ... K), the means for estimating correlation matrix with exponential smoothing q (distance rq: q=1, ..., N), the means for estimating presence and movement state of target OM are not provided because these means are similar to those described in relation to the embodiment of FIG. 1.

The means for obtaining surroundings of ones own vehicle SN4 obtains a speed limit in a road on which ones own vehicle is driven, and outputs the obtained as information on speed limit AI4. As one of the methods of obtaining the surroundings of ones own vehicle, a peripheral image is obtained with a CCD sensor, and by picture processing and/or picture recognition on traffic control signs, the speed limit is determined. The road on which ones own vehicle is driven is determined to be either a highway or an ordinary road based on the thus obtained speed limit information, and the result may be outputted as information on road division.

The means for determining forgetting factor determines the forgetting factors $\alpha$ to be given to the means for estimating correlation matrix with exponential smoothing 1 through N on the basis of the information regarding speed limit AI4 or the information regarding road division. The optional forgetting factor $\alpha$ can be thus set according to the information regarding the speed limit or road division.

The means for determining forgetting factor FX may determine the forgetting factors $\alpha$ to be given to the means for estimating correlation matrix with exponential smoothing 1 through N according to the speed limit obtained from the information regarding speed limit AI4. The speed limit is determined in such a way that a speed limit which is smaller than a predetermined threshold value is determined to be a low speed limit, while a the speed limit which is the same as or bigger than a predetermined threshold value is determined to be a high speed limit. On the basis of such a determination regarding speed limit, the small forgetting factor $\alpha$ of the most suitable predetermined ones is selected in case of high speed limit, the big forgetting factor $\alpha$ of the most suitable predetermined ones is selected in case of low speed limit, and the selected is outputted as the forgetting factor $\alpha$.

In addition, the means for determining forgetting factor FX may determine the forgetting factors $\alpha$ to be provided to the means for estimating correlation matrix with exponential smoothing 1 through N according to the type of road (i.e., highway or ordinary road) on which ones own vehicle runs, which is obtained from the road division information. Whether the road is a highway or an ordinary road is determined in such a way that the speed limit which is smaller than a predetermined threshold value is deemed to be an ordinary road, and the speed limit which is the same as or bigger than a predetermined threshold value is deemed to be a highway. On the basis of such a determination, the small forgetting factor $\alpha$ of the most suitable predetermined ones is selected in case of a highway, and the big forgetting factor $\alpha$ of the most suitable predetermined ones, is selected in case of an ordinary road, and the selected factor is outputted as the forgetting factor α.

By doing so, it is thus possible to suitably obtain high transient response performance of the correlation matrix estimation which is required for a target signal that is expected to change at the time of high speed limit, such as for a highway, and high S/N improvement performance which is required at the time of low speed limit, such as for an ordinary road.

Another embodiment of the invention will now be described in relation to FIG. 24. The radar signal processor 12 of FIG. 24 has a car navigation SN5 in place of the means for obtaining surroundings of ones own vehicle SN4 of the radar signal processor 12 of FIG. 23. As such, explanations of the structural elements other than the car navigation will not be provided.

The car navigation SN5 obtains the present position of ones own vehicle with a GPS, and outputs information on speed limit in the present position in map information which is stored in advance.

The means for determining forgetting factor FX determines the forgetting factors α to be given to the means for estimating correlation matrix with exponential smoothing 1 through N according to the information on speed limit.

Figure 23:
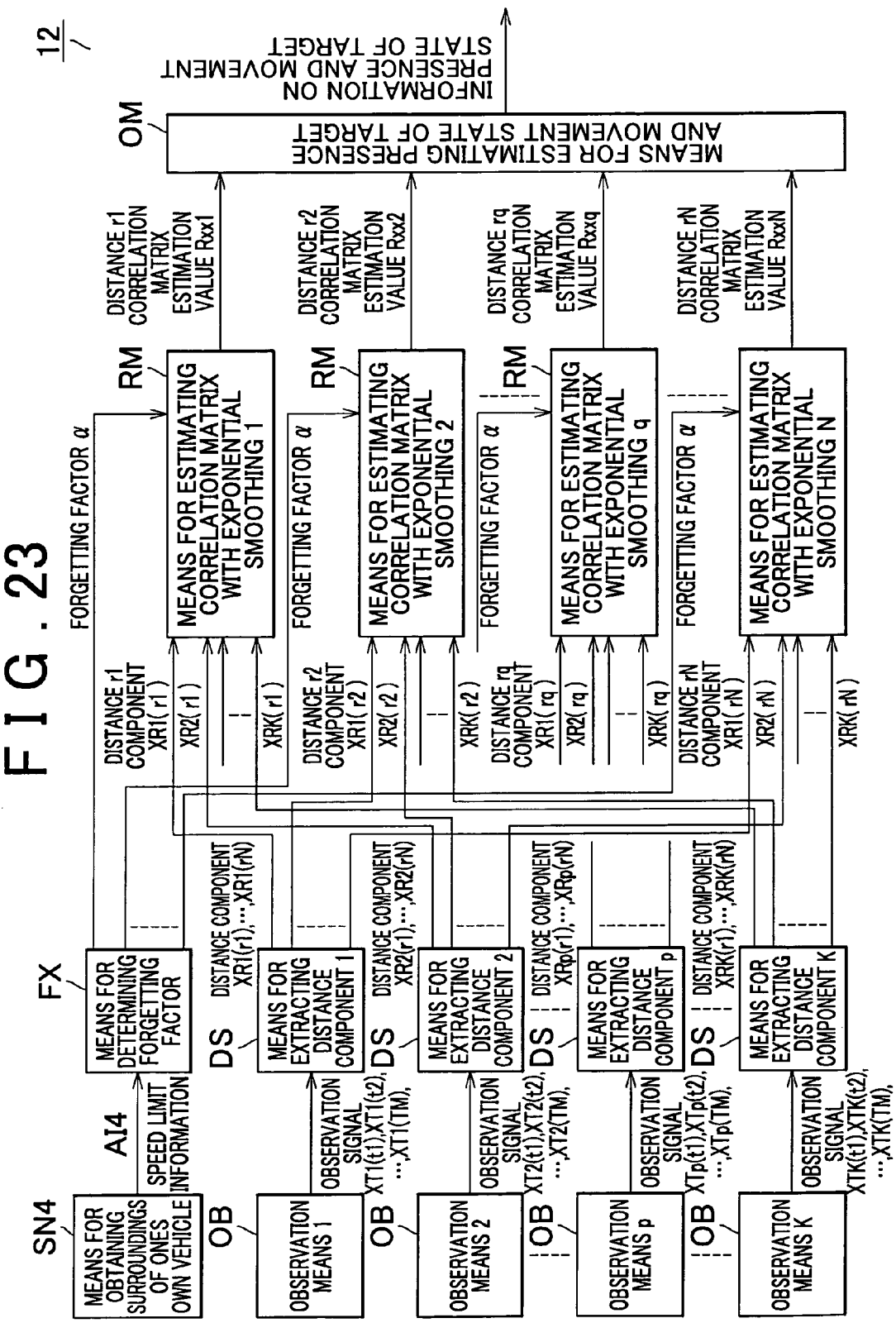
FIG. 23 is a block diagram showing a schematic structure of the vehicle-mounted array radar apparatus of a fifteenth embodiment of the invention.
Figure 24:
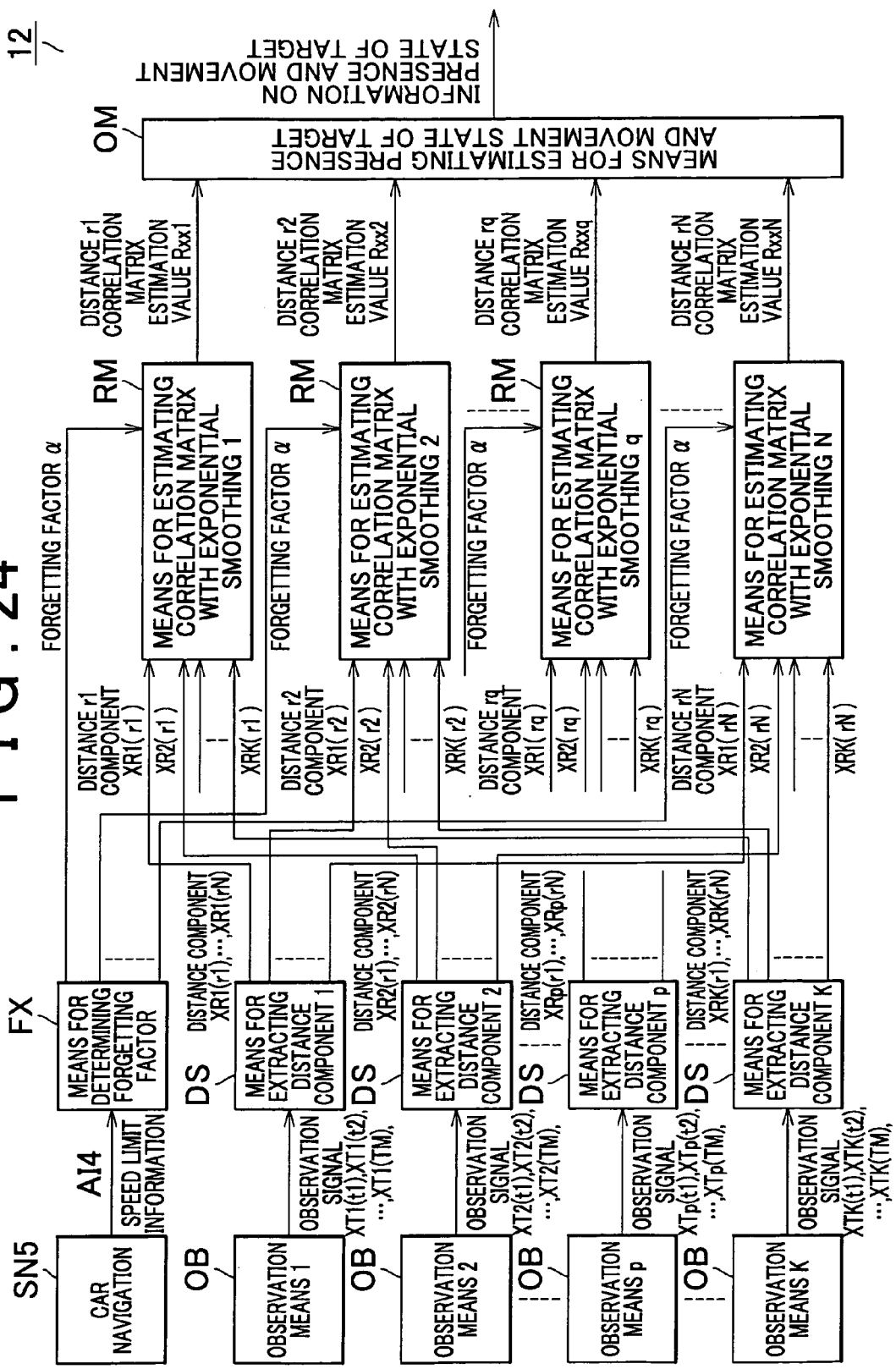
FIG. 24 is a block diagram showing a schematic structure of the vehicle-mounted array radar apparatus of a seventeenth embodiment of the invention.

By doing so, results similar to the invention of FIG. 23 can be obtained with the car navigation which can be easily mounted.

Figure 25:
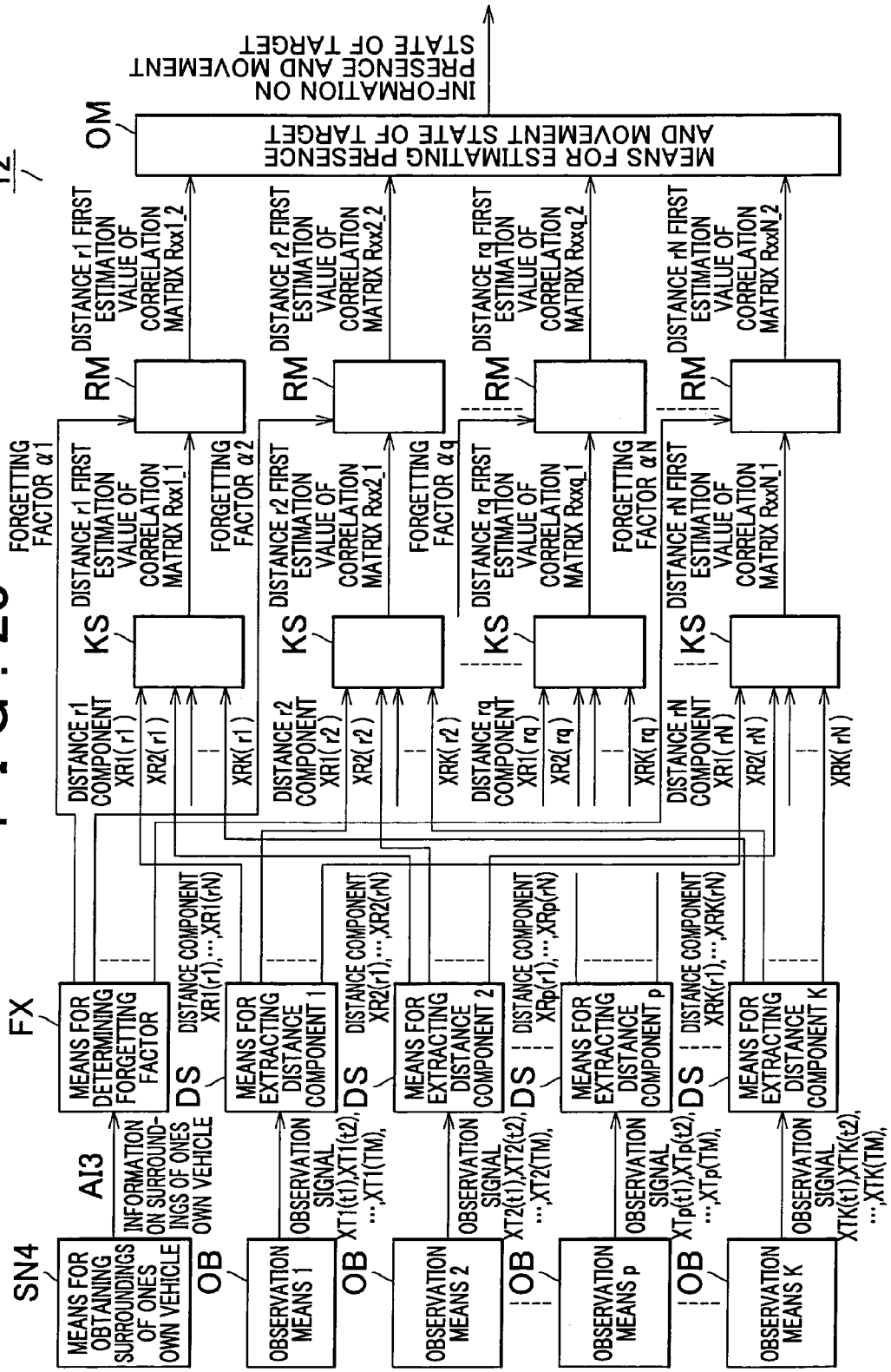
FIG. 25 is a block diagram showing a schematic structure of the vehicle-mounted array radar apparatus of an eighteenth embodiment of the invention.

Another embodiment of the invention will now be described in relation to FIG. 25. The radar signal processor 12 of FIG. 25 has observed means 1 through K denoted with reference numerals OB, means for respectively extracting distance components 1 through K denoted with reference numerals DS, means for estimating correlation matrix with section average 1 through N denoted with reference numerals KS, means for respectively estimating correlation matrices with exponential smoothing 1 through N denoted with reference numerals RM, means for estimating presence and movement state of target denoted with the reference numeral OM, means for obtaining surroundings of ones own vehicle denoted with the reference numeral SN4, and means for determining forgetting factor denoted with the reference numeral FX.

Explanations of the observation means p (array components P=1, 2, ... K), means for extracting distance component p (array components P=1, 2, ... K), means for estimating correlation matrix with section average q (distance rq: q=1, ..., N), means for estimating correlation matrix with exponential smoothing q (distance rq: q=1, ..., N), means for estimating presence and movement state of target OM are not provided because these means are similar to those described in relation to the embodiment of FIG. 15.

Figure 22:
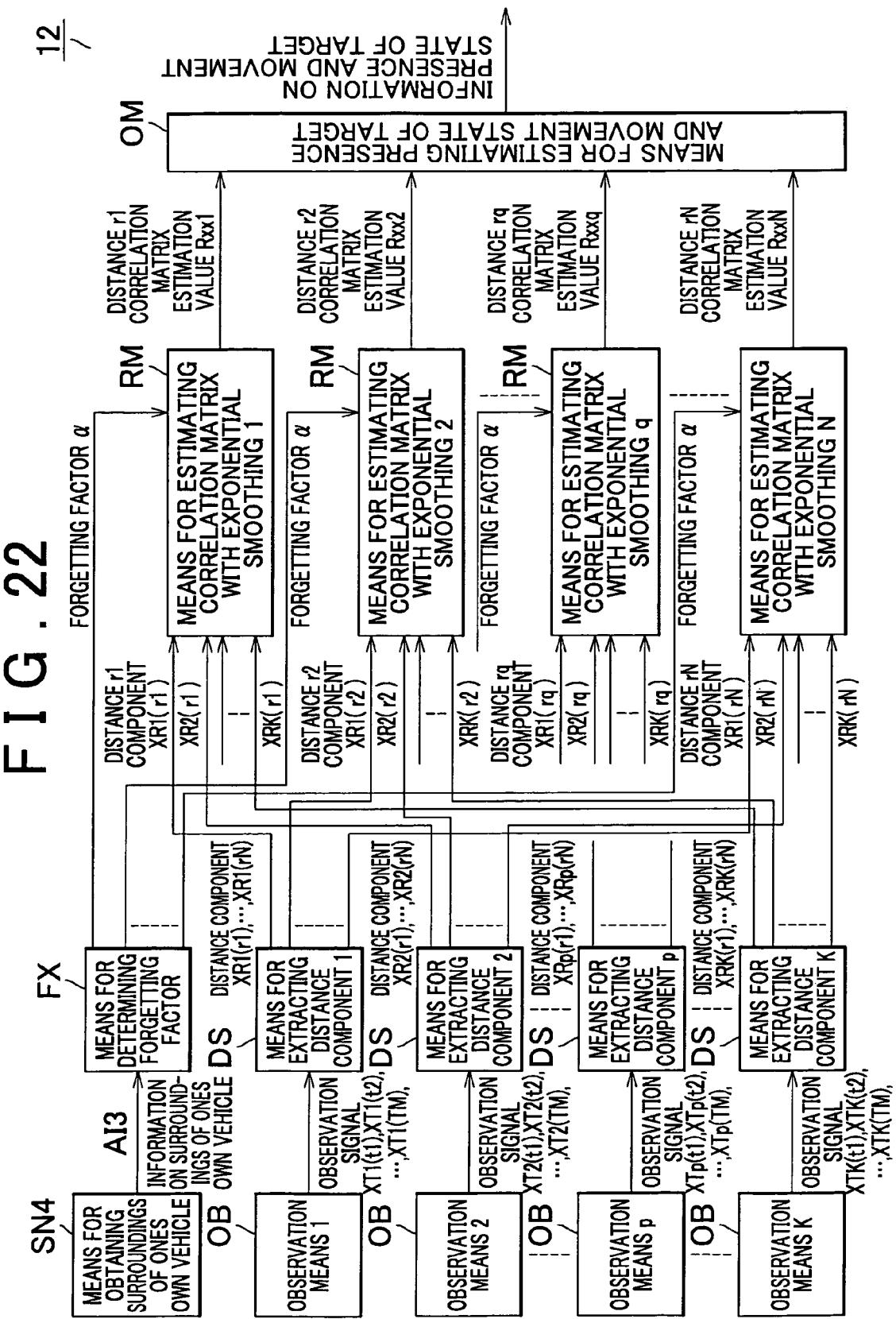
FIG. 22 is a block diagram showing a schematic structure of the vehicle-mounted array radar apparatus of a fourteenth embodiment of the invention.

Further, explanations of the means for obtaining surroundings of ones own vehicle SN4 and the means for determining forgetting factor FX are not provided because these means are similar to those described in relation to the embodiment of FIG. 22.

In the array radar apparatus for estimating the correlation matrix with the means for estimating correlation matrix with section average KS and the means for estimating correlation matrix with exponential smoothing RM which are arranged in series, the forgetting factors α can be optionally set according to the surroundings of ones own vehicle.

Another embodiment of the invention will now be described in relation to FIG. 26. The radar signal processor 12 of FIG. 26 has observation means 1 through K denoted with reference numerals OB, means for respectively extracting distance components 1 through K denoted with reference numerals DS, means for respectively estimating correlation matrices with exponential smoothing 1 through N denoted with reference numerals RM, means for estimating presence and movement state of target denoted with the reference numeral OM, means for obtaining radio wave state denoted with a reference numeral SN5, and means for determining forgetting factor denoted with the reference numeral FX.

Explanations of the observation means p (array components P=1, 2, ... K), means for extracting distance component p (array components P=1, 2, ... K), means for estimating correlation matrix with exponential smoothing q (distance rq: q=1, ..., N), and means for estimating presence and movement state of target OM are not provided because these means are similar to those described in relation to the embodiment of FIG. 1.

The means for obtaining radio wave state SN5 obtains information on radio wave state AI5 of the surroundings of ones own vehicle by analyzing waves received by a wave receiver. The information on radio wave state AI5 are a power of the received wave, the presence of the received wave and its power at the time of no transmitting of wave by the observation means. The obtained information regarding radio wave state AI5 is outputted to the means for determining forgetting factor FX.

The means for determining forgetting factor FX determines the forgetting factors α to be provided to the means for estimating correlation matrix with exponential smoothing 1 through N on the basis of the information on radio wave state AI5. For example, the small forgetting factor α of the most suitable predetermined ones is selected if the power of the received wave is higher than a predetermined threshold value, and the big forgetting factor α of the most suitable predetermined ones is selected if the power of the received wave is the same as or lower than a predetermined threshold value. The selected factor is then output as the forgetting factor α. As such, the forgetting factor α increases when the radio wave state is bad (i.e., where an influence of noise is large due to small power of received wave), so that a S/N improvement, which is required at time of such a bad radio wave state, can be obtained.

The forgetting factor α can thus be optionally set according to the radio wave state.

Figure 27:
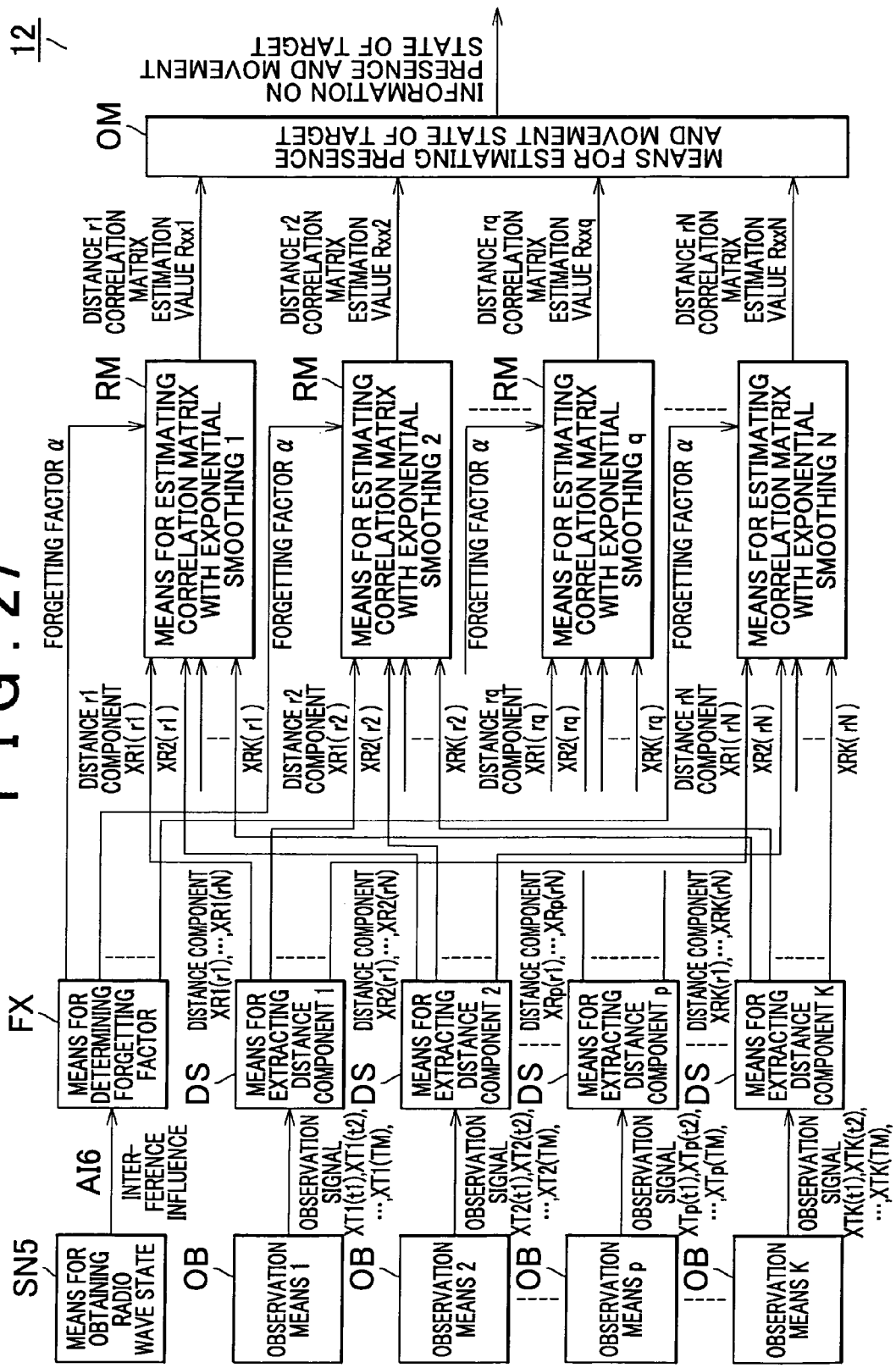
FIG. 27 is a block diagram showing a schematic structure of the vehicle-mounted array radar apparatus of a twentieth embodiment of the invention.

Another embodiment of the invention will now be described in relation to FIG. 27. The radar signal processor 12 of FIG. 27 has observation means 1 through K denoted with reference numerals OB, means for respectively extracting distance components 1 through K denoted with reference numerals DS, means for respectively estimating correlation matrix with exponential smoothing 1 through N denoted with reference numerals RM, means for estimating presence and movement state of target denoted with the reference numeral OM, means for obtaining radio wave state denoted with the reference numeral SN5, and means for determining forgetting factor denoted with the reference numeral FX.

Explanations of the observation means p (array components P=1, 2, ... K), and the means for extracting distance component p (array components P=1, 2, ... K), the means for estimating correlation matrix with exponential smoothing q (distance rq: q=1, ..., N), and the means for estimating presence and movement state of target OM are not provided because these means are similar to those described in relation to the embodiment of FIG. 1.

The means for obtaining radio wave state SN5 obtains an interference influence AI6 by the other radar signal processors by analyzing waves received by a wave receiver. The interference influence AI6 is determined by a strength of the power of received wave at the time when the observation means transmits no wave so as to increase the interference influence according to the increase in power. The obtained interference influence AI6 is output to the means for determining forgetting factor FX. "The interference by the other radar signal processors" is the interference caused by transmitted waves from the radar signal processor mounted on a vehicle, traveling in an opposite direction, for instance.

The means for determining forgetting factor FX determines the forgetting factors α to be provided to the means for estimating correlation matrix with exponential smoothing 1 through N on the basis of the interference influence AI6. For example, the small forgetting factor α of the most suitable predetermined ones is selected if the interference influence AI6 is higher than a predetermined threshold value, and the big forgetting factor α of the most suitable predetermined ones is selected if the interference influence AI6 is the same as or lower than a predetermined threshold value. The selected value is then output as the forgetting factor α. As such, the influence by the past estimated value of the correlation matrix which has received the interference influence can be restricted since the forgetting factor α decreases if the interference influence AI6 is big.

The forgetting factor α can be thus optionally set according to the interference influence.

At this time, zero (0) may be selected and output as the forgetting factor α if the interference influence is higher than a predetermined threshold value.

By doing so, the influence by the past estimated value of the correlation matrix, which includes the interference influence, can be completely removed since the forgetting factor α becomes zero (0) if the interference influence AI6 is very big.

A further embodiment of the invention will now be described in relation to FIG. 28. The radar signal processor 12 of FIG. 28 has the observation means 1 through K denoted with reference numerals OB, means for respectively extracting distance components 1 through K denoted with reference numerals DS, means for estimating correlation matrix with section average 1 through N denoted with reference numerals KS, means for respectively estimating correlation matrix with exponential smoothing 1 through N denoted with reference numerals RM, means for estimating presence and movement state of target denoted with the reference numeral OM, means for obtaining radio wave state denoted with the reference numeral SN5, and means for determining forgetting factor denoted with the reference numeral FX.

Explanations of the observation means p (array components P=1, 2, ... K), the means for extracting distance component p (array components P=1, 2, ... K), the means for estimating correlation matrix with section average q (distance rq: q=1, ..., N), the means for estimating correlation matrix with exponential smoothing q (distance rq: q=1, ..., N), and the means for estimating presence and movement state of target OM are not provided because these means are similar to those described in relation to the embodiment of FIG. 15.

Figure 26:
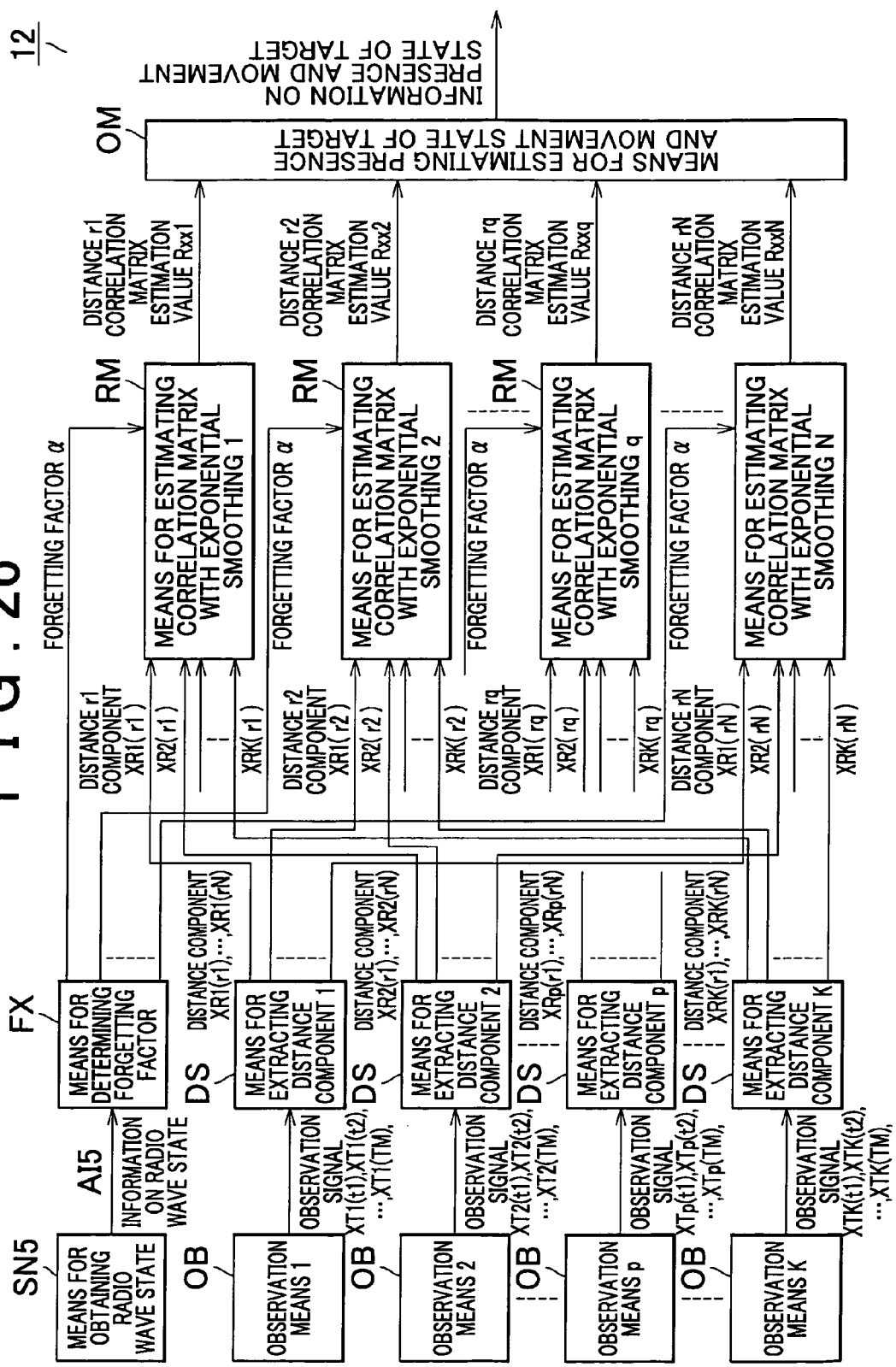
FIG. 26 is a block diagram showing a schematic structure of the vehicle-mounted array radar apparatus of a nineteenth embodiment of the invention.

In addition, explanations of the means for obtaining radio wave state SN5 and the means for determining forgetting factor FX are not provided because these means are similar to those described in relation to the embodiment of FIG. 26.

In the array radar apparatus for estimating the correlation matrix with means for estimating correlation matrix with section average KS and the means for estimating correlation matrix with exponential smoothing RM arranged in series, the forgetting factors α can be optionally set according to the radio wave state.

This invention can be utilized as a radar signal processor of a vehicle-mounted radar apparatus for detecting presence of preceding vehicles.

The present invention has been explained on the basis of the foregoing exemplary embodiments. Although some variations have been mentioned, the embodiments which are described in the specification are illustrative and not limiting. The scope of the invention is designated by the accompanying claims and is not restricted by the descriptions of the specific embodiments. Accordingly, transformations and changes within the scope of the claims are to be construed as included within the scope of the present invention.

The invention claimed is:

1. A radar signal processor comprising:

two or more observation means for receiving a reflected wave from a target as a received signal through a receiving antenna and for outputting a predetermined observation signal;

means for respectively extracting a distance component corresponding to a distance to a target to be detected from said receiving antenna from said each observation signal;

means for estimating a correlation matrix, for collecting respective said extracted distance components and for computing and estimating an estimated value of a correlation matrix corresponding to said respective distance components with a forgetting factor corresponding to said each distance component as a parameter by an exponential smoothing method;

means for estimating a presence and a movement state of a target, for estimating a presence of a target and movement state of said target on the basis of said respective estimated value of said correlation matrix which was estimated by said means for estimating correlation matrix; and means for determining a forgetting factor depending on distance, for respectively computing and determining said forgetting factors corresponding to said distance to said target to be detected from said receiving antennas, and for respectively outputting said computed and determined forgetting factors as said forgetting factors corresponding to said respective distance components to said means for estimating a correlation matrix.

2. The radar signal processor according to claim 1, wherein said means for determining forgetting factor depending on distance respectively computes and determines said forgetting factors corresponding to said distances to said target to be detected from said receiving antennas according to an attenuation of said reflected wave due to said distance.

3. The radar signal processor according to claim 1, wherein said means for extracting distance component has a range discrete Fourier Transform means, for respectively computing and extracting components of respective frequencies corresponding to said distance to said target to be detected from said receiving antenna as said distance component by discrete Fourier transform on the basis of said observation signal.

4. The radar signal processor according to claim 3, wherein said means for determining forgetting factor depending on distance respectively computes and determines said forgetting factor corresponding to said distances to said target to be detected from said receiving antennas according to an attenuation of said reflected wave due to said distance.

5. The radar signal processor according to claim 1, wherein said means for estimating correlation matrix has means for estimating a correlation matrix with section average and means for estimating a correlation matrix with exponential smoothing, said means for estimating a correlation matrix with section average collects respective said distance components extracted by said means for extracting a distance component and computes and estimates a first estimated value of a correlation matrix corresponding to said respective distance components by a section average method, said means for estimating a correlation matrix with exponential smoothing computes and estimates a second estimated value of a correlation matrix corresponding to said respective distance components with a forgetting factor corresponding to said each distance component as a parameter by an exponential smoothing method from said first estimated value of said correlation matrix which was computed and estimated, said means for estimating a presence and movement state of a target estimates a presence of a target or a movement state of said target on the basis of said second estimated value of said correlation matrix which was estimated, and said means for determining a forgetting factor depending on distance respectively computes and determines said forgetting factors corresponding to said distances to said target to be detected from said receiving antennas, and respectively outputs said computed and determined forgetting factors as said forgetting factors corresponding to said respective distance components to said means for estimating correlation matrix with exponential smoothing.

* * * * *